US010547351B2

(12) United States Patent
Kadowaki et al.

(10) Patent No.: US 10,547,351 B2
(45) Date of Patent: Jan. 28, 2020

(54) INFORMATION PROCESSING DEVICE, DISPLAY DEVICE, SHORT-RANGE WIRELESS COMMUNICATION SYSTEM, AND METHOD FOR CONTROLLING INFORMATION PROCESSING DEVICE

(71) Applicant: Sharp Kabushiki Kaisha, Osaka (JP)

(72) Inventors: Motohiro Kadowaki, Osaka (JP); Keiko Hirukawa, Osaka (JP); Yoshinari Sawata, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 362 days.

(21) Appl. No.: 15/516,017

(22) PCT Filed: Oct. 1, 2015

(86) PCT No.: PCT/JP2015/077989
§ 371 (c)(1),
(2) Date: Apr. 19, 2017

(87) PCT Pub. No.: WO2016/052716
PCT Pub. Date: Apr. 7, 2016

(65) Prior Publication Data
US 2017/0279499 A1    Sep. 28, 2017

(30) Foreign Application Priority Data
Oct. 2, 2014    (JP) .................................. 2014-204174

(51) Int. Cl.
*H04B 5/00* (2006.01)
*H04B 5/02* (2006.01)
(Continued)

(52) U.S. Cl.
CPC ............. *H04B 5/0056* (2013.01); *G06F 3/14* (2013.01); *G06K 7/10297* (2013.01); *H04B 5/02* (2013.01);
(Continued)

(58) Field of Classification Search
CPC .... H04B 5/0056; H04B 5/02; G06K 7/10297; G06F 3/14
(Continued)

(56) References Cited

U.S. PATENT DOCUMENTS

2011/0207401 A1*    8/2011    Han .................... H04B 5/0062
455/41.1
2011/0312271 A1    12/2011    Ma et al.
(Continued)

FOREIGN PATENT DOCUMENTS

JP    2000-215278 A    8/2000
JP    2003-162693 A    6/2003
(Continued)

OTHER PUBLICATIONS

Ishikawa et al., Display/Input Apparatus and Display/Input Method, Patent Translation of JP2003162693 (Year: 2003).*

*Primary Examiner* — Ayodeji O Ayotunde
(74) *Attorney, Agent, or Firm* — ScienBiziP, P.C.

(57) ABSTRACT

Communication which a user does not desire is prevented. As information processing device (1) includes: a region specifying section (23) which determines a given region of a display region of a display section (18) of a display device (11), the given region corresponding to an element image included in a screen displayed on the display section (18); and an antenna control section (24) which (i) controls, to be in a communication state, an antenna (150) which is included in the given region and (ii) controls another antenna (150) to be in a non-communication state.

17 Claims, 22 Drawing Sheets

(51) Int. Cl.
  *G06F 3/14* (2006.01)
  *G06K 7/10* (2006.01)
  *G06F 3/0484* (2013.01)
  *G06F 3/0488* (2013.01)

(52) U.S. Cl.
  CPC ........ *G06F 3/0488* (2013.01); *G06F 3/04842* (2013.01); *G06K 2007/10524* (2013.01)

(58) Field of Classification Search
  USPC ................................................ 455/41.1, 566
  See application file for complete search history.

(56) References Cited

U.S. PATENT DOCUMENTS

| | | |
|---|---|---|
| 2013/0285797 A1 | 10/2013 | Paulsen et al. |
| 2013/0332228 A1 | 12/2013 | Lim et al. |
| 2013/0332354 A1 | 12/2013 | Rhee et al. |
| 2014/0055395 A1 * | 2/2014 | Kim ...................... G06F 3/0485 345/173 |
| 2014/0101737 A1 | 4/2014 | Rhee |
| 2014/0185228 A1 * | 7/2014 | Iizuka ...................... G06F 1/16 361/679.32 |
| 2015/0170210 A1 | 6/2015 | Rhee et al. |
| 2017/0039548 A1 | 2/2017 | Rhee et al. |

FOREIGN PATENT DOCUMENTS

| | | | |
|---|---|---|---|
| JP | 2003162693 A | * | 6/2003 |
| JP | 2011-3150 A | | 1/2011 |
| JP | 2011-175626 A | | 9/2011 |
| JP | 2012-504356 A | | 2/2012 |
| JP | 2013-84945 A | | 5/2013 |
| JP | 2013-239164 A | | 11/2013 |
| JP | 2013-257878 A | | 12/2013 |
| JP | 5367847 A | | 12/2013 |
| WO | 2010/037218 A | | 4/2010 |

* cited by examiner

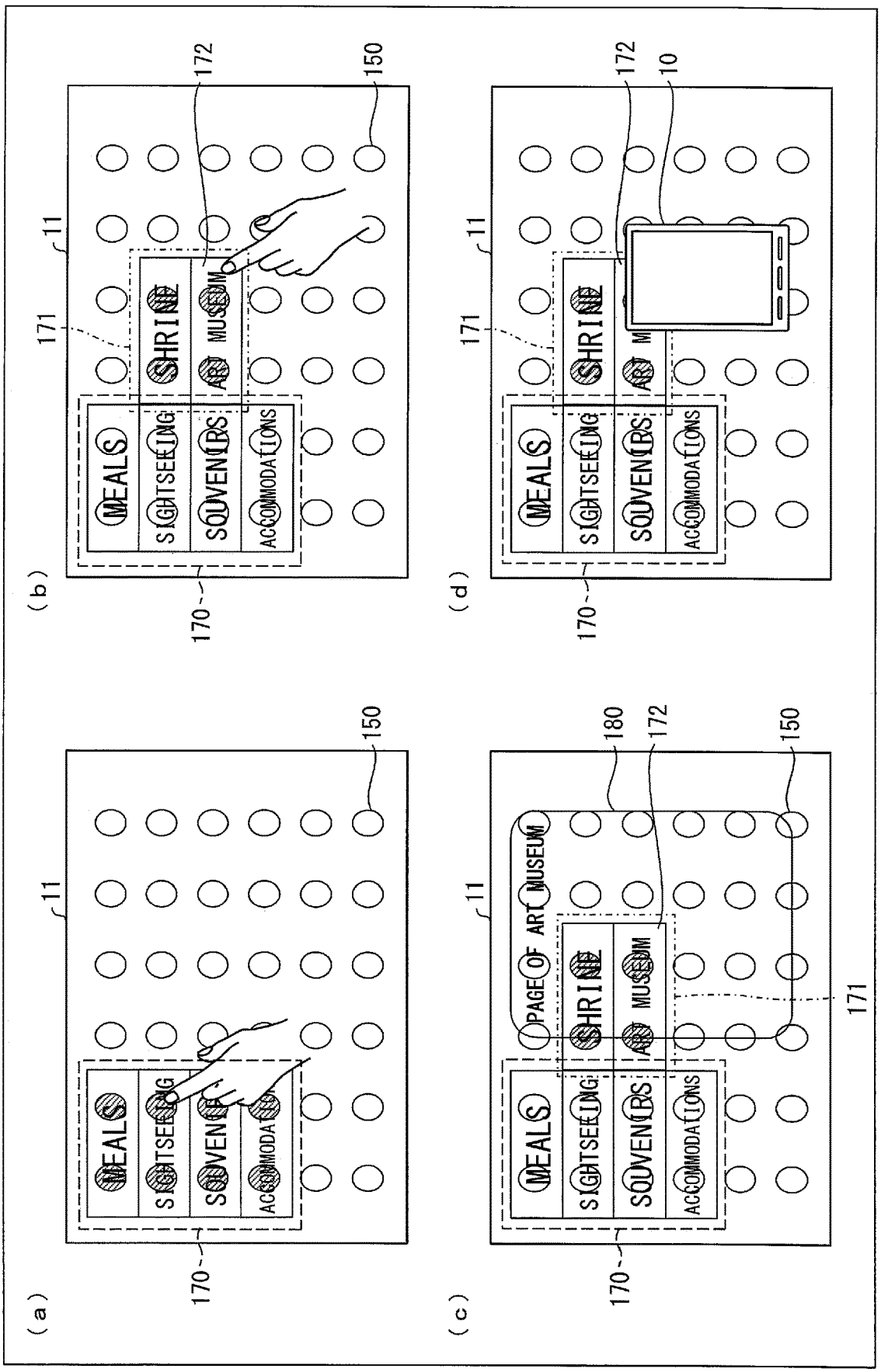

FIG. 4

(a)
```
<contents>
 <menuList>
   <menu link="http://xxx/xxx/a" title="MEALS"></menu>
   <menu link="http://xxx/xxx/b" title="SIGHTSEEING">
    <menu link="http://xxx/xxx/b1" title="SHRINE"></menu>
    <menu link="http://xxx/xxx/b2" title="ART MUSEUM"></menu>
   </menu>
   <menu link="http://xxx/xxx/c" title="SOUVENIRS"></menu>
   <menu link="http://xxx/xxx/d" title="ACCOMMODATIONS"></menu>
 </menuList>
 <mainArea>
   ...
 </mainArea>
</contents>
```

(b)

http://yyy/yyy/link?account=a (c)

http://yyy/yyy/link?account=a&func=add&link=http://xxx/xxx/b2

http://xxx/xxx/photo?account=a (b)

http://xxx/xxx/photo?account=b (c)

http://xxx/xxx/photo?account=a&func=photolist (d)

```
<photoList account="a">
  <photo src="http://xxx/xxx/photo?account=a&photo=1">
  </photo>
  <photo src="http://xxx/xxx/photo?account=a&photo=2">
  </photo>
  <photo src="http://xxx/xxx/photo?account=a&photo=3">
  </photo>
  ...
</photoList>
```

(e)

http://xxx/xxx/photo?account=b&func=photocopy&source=a&photo=13

(a)

(b)

```
<photoList account="a">
  <photo src="http://xxx/xxx/photo?account=a&photo=1" access="true">
  </photo>
  <photo src="http://xxx/xxx/photo?account=a&photo=2" access="false">
  </photo>
  <photo src="http://xxx/xxx/photo?account=a&photo=3" access="true">
  </photo>
  ...
</photoList>
```

INFORMATION PROCESSING DEVICE, DISPLAY DEVICE, SHORT-RANGE WIRELESS COMMUNICATION SYSTEM, AND METHOD FOR CONTROLLING INFORMATION PROCESSING DEVICE

TECHNICAL FIELD

The present invention relates to an information processing device and the like each for controlling a state of each antenna via which near field communication is performed.

BACKGROUND ART

Conventionally, near field communication has been used for transmission/reception of information. In near field communication, transmission/reception of information is performed by bringing a tag reader and a tag into proximity to each other. Patent Literatures 1 to 8 below each disclose a near field communication technique. For example, Patent Literature 1 discloses a technique for activating a tag reader in a case where a touch sensor detects presence of a tag. This technique is intended to reduce electric power consumption. Further, Patent Literature 2 discloses a display device including a plurality of tags.

CITATION LIST

Patent Literatures

[Patent Literature 1]
Japanese Patent Application Publication Tokukai No. 2013-239164 (Publication date: Nov. 28, 2013)
[Patent Literature 2]
Japanese Patent Application Publication Tokukai No. 2011-175626 (Publication date: Sep. 8, 2011)
[Patent Literature 3]
Published Japanese Translation of PCT International Application, Tokuhyo, No. 2012-504356 (Publication date: Feb. 16, 2012)
[Patent Literature 4]
Japanese Patent No. 5367847 (Registration date: Sep. 20, 2013)
[Patent Literature 5]
Japanese Patent Application Publication Tokukai No. 2013-257878 (Publication date: Dec. 26, 2013)
[Patent Literature 6]
Japanese Patent Application Publication Tokukai No. 2013-84945 (Publication date: May 9, 2013)
[Patent Literature 7]
Japanese Patent Application Publication Tokukai No. 2000-215278 (Publication dare: Aug. 4, 2000)
[Patent Literature 8]
Japanese Patent Application Publication Tokukai No. 2011-3150 (Publication date: Jan. 6, 2011)

SUMMARY OF INVENTION

Technical Problem

In Patent Literature 2, the display device includes a plurality of tags and communication, is performed by bringing a tag reader into proximity to any of the plurality of tags, lit a case as in Patent Literature 2, there has been a problem that communication which a user does not desire is performed when the user by mistake brings the tag reader into proximity to a tag to which originally the tag reader should not be brought into proximity. The techniques disclosed in the above Patent Literatures, respectively, are not sufficient to solve the problem. For example, according to the technique of Patent Literature 1, since the tag reader is activated even in a case where a tag brought into proximity to the tag reader is not a tag which originally a user should bring into proximity to be tag reader, communication which a user does not desire is performed.

The above problem is particularly evident in a configuration in which different types of information are transmitted/received depending on positions of respective tags (or a position of a tag reader). Specifically, when a user by mistake brings a tag reader (or a tag) into proximity to a tag (or a tag reader), to which tag the tag reader should not be brought into proximity originally, information which the user does not desire is obtained or a process which the user does not desire is performed.

The present invention has been made in view of the above problem, and an object, of the present invention is to provide an information processing device and the like each capable of preventing communication which a user does not desire.

Solution to Problem

In order to attain the above object, an information processing device in accordance with an aspect of the present invention is an information processing device which controls each of a plurality of antennas of a display device to be in a communication state or in a non-communication state, the communication state being a state in which the each of the plurality of antennas allows external near field communication to be per formed via the each of the plurality of antennas, the non-communication state being a state in which the each of the plurality of antennas allows the external near field communication not to be performed via the each of the plurality of antennas, the display device including a display section and a near field communication section which is provided on the display section so as to be stacked on the display section and which includes the plurality of antennas via each of which the external near field communication is performed, the information processing device including: a region determining section which determines a given region of a display region of the display section in accordance with a region of an element image included in a screen displayed on the display section; and an antenna control section which (i) controls, to be in the communication state, at least one of the plurality of antennas which at least one is included in the given region and (ii) controls another one or more of the plurality of antennas to be in the non-communication state.

Further, in order to attain the above object, a display device in accordance with an aspect of the present invention is a display device including: a display section; and a near field communication section which is provided on the display section so as to be stacked on the display section and which includes a plurality of antennas via each of which external near field communication is performed, the near field communication section controlling, in accordance with a region of an element image included in a screen displayed on die display section, each of the plurality of antennas to be in a communication state or in a non-communication state, the communication state being a state in which the each of the plurality of antennas allows the external near field communication to be performed via the each of the plurality of antennas, the non-communication slate being a state in which the each of the plurality of antennas allows the external near field communication not to be performed via the each of the plurality of antennas.

Further, in order to attain the above object, a terminal device in accordance with an aspect of the present invention is a terminal device including: a transmitting section which transmits given information to a display device, the display device including a display section and a near field communication section which is provided on the display section so as to be stacked on the display section and which includes a plurality of antennas via each of which external near field communication is performed, each of the plurality of antennas being in a communication state or in a non-communication state, the communication state being a stale in which the each of the plurality of antennas allows the external near field communication to be performed via the each of the plurality of antennas, the non-communication state being a state in which the each of the plurality of antennas-allows the external near field communication not to be performed via the each of the plurality of antennas, the transmitting section transmitting the given information to the display device via one of the plurality of antennas which one is in the communication state, by being brought into proximity to the one of the plurality of antennas, the terminal device causing, by transmission of the given information, a process to be performed, the process being associated with an element image included in a screen displayed in a region of the display section which region includes the one of the plurality of antenna which one is used for the transmission of the given information.

Further, in order to attain the above object, a near filed communication system in accordance with an aspect of the present invention is a near filed communication system including: a display device which includes a display section and a near field communication section that is provided on the display section so as to be stacked on the display section and that includes a plurality of antennas via each of which external near field communication is performed; and an information processing device which controls each of the plurality of antennas of the display device to be in a communication state or in a non-communication state, tire communication state being a state in which the each of the plurality of antennas allows the external near field communication to fee performed via the each of the plurality of antennas, the non-communication state being a state in which the each of the plurality of antennas allows the external near field communication not to be performed via the each of the plurality of antennas, the information processing device (i) controlling, to be in the communication state, at least one of the plurality of antennas which at least one is included in a given region of a display region of the display section and (ii) controlling another one or more of the plurality of antennas to be in the non-communication state, the given region being determined in accordance with a region of an element image included in a screen displayed on the display section.

Further, in order to attain the above object, a method of controlling an information processing device in accordance with an aspect of the present invention is a method of controlling an information processing device which controls each of a plurality of antennas of a display device to be in a communication state or in a non-communication state, the communication state being a state in which the each of the plurality of antennas allows external near field communication to be performed via the each of the plurality of antennas, the non-communication state being a state in which the each of the plurality of antennas allows the external near field communication not to be performed via the each of the plurality of antennas, the display device including a display section and a near field communication section which is provided on the display section so as to be stacked on the display section and which includes the plurality of antennas via each of which the external near field communication, is performed, the method including: a region determining step of determining a given region of a display region of the display section in accordance with a region of an element image included in a screen displayed on the display section; and an antenna controlling step of (i) controlling, to be in the communication state, at least one of the plurality of antennas which at least one is included in the given region and (ii) controlling another one or more of the plurality of antennas to be in the non-communication state.

Advantageous Effects of Invention

According to an aspect of the present invention, it is possible to prevent communication which a user does not desire.

Figure 1:
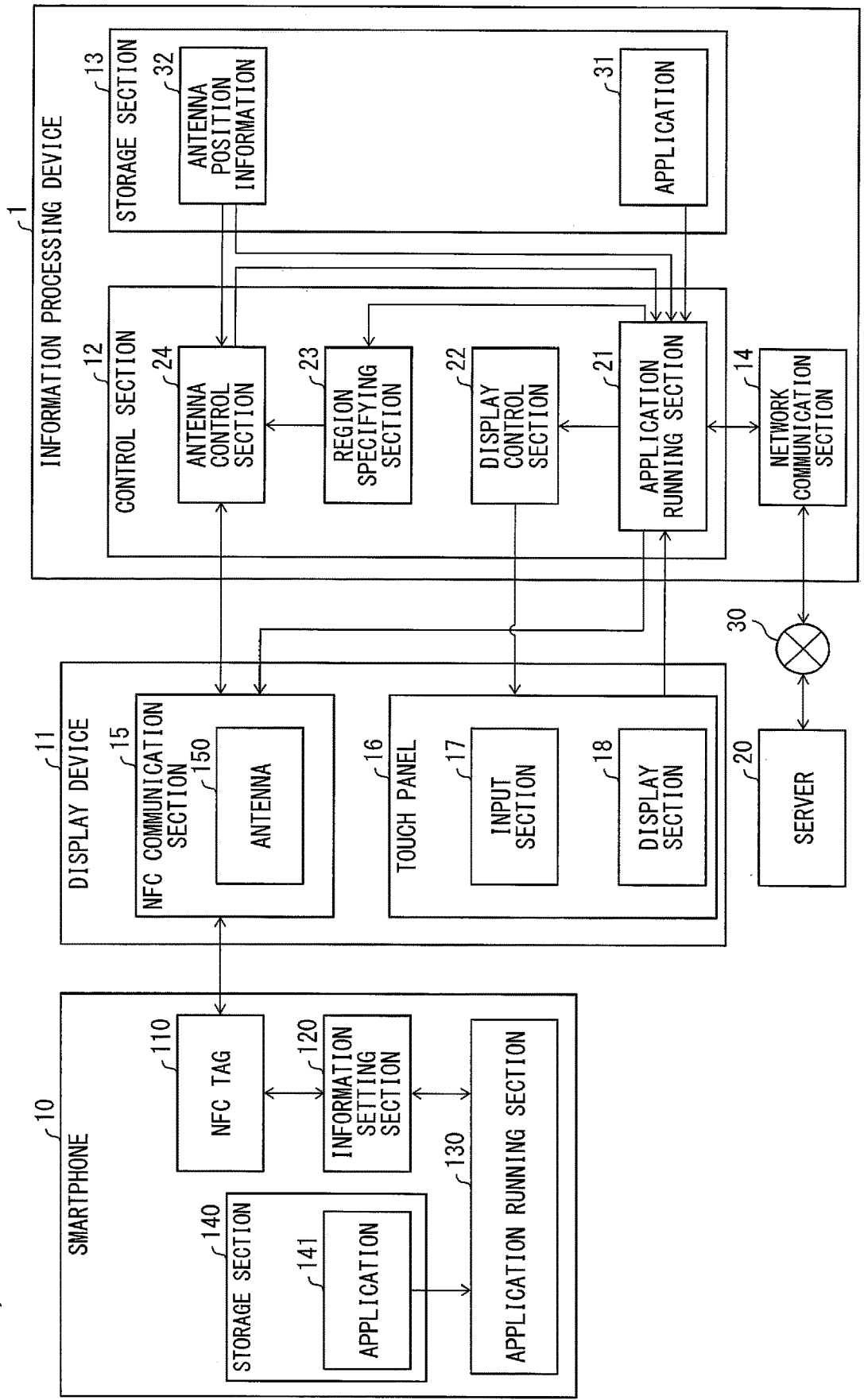
FIG. 1 is a block diagram illustrating an example configuration of a main part of each of an information processing device, a display device, and a smartphone which are included in a near filed communication system of the present invention.
Figure 2:
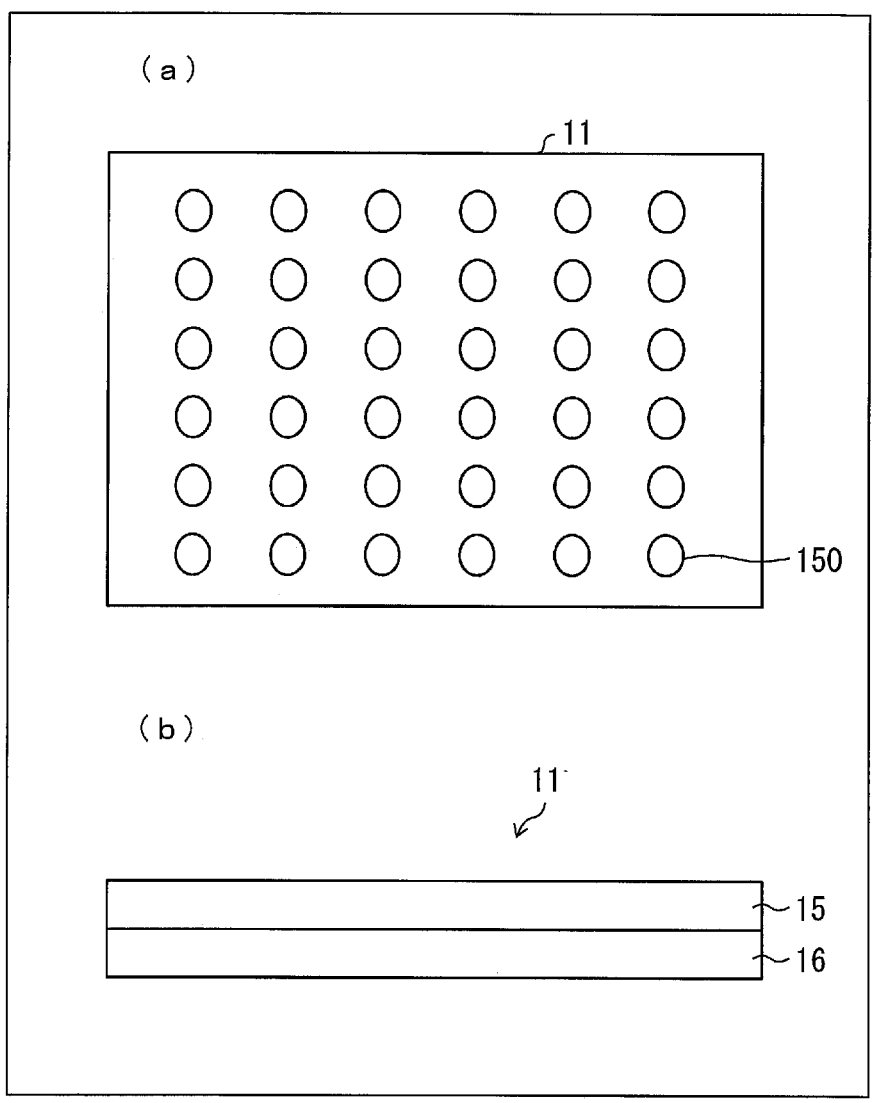

(a) of FIG. 2 is an appearance diagram illustrating the display device illustrated in FIG. 1, as viewed from the front, (b) of FIG. 2 is an appearance diagram illustrating the display device illustrated in FIG. 1, as viewed from the side.

FIG. 3 is a transition diagram illustrating an example of a flow of an antenna control process of Embodiment 1.

(a) of FIG. 4 is a view illustrating a specific example of a script for display of a menu image illustrated in FIG. 3. (b) of FIG. 4 is a view illustrating setting information transmitted from the smartphone, illustrated in (d) of FIG. 3, to the information processing device, (c) of FIG. 4 is a view illustrating setting information transmitted to the smartphone, illustrated in (d) of FIG. 3, after the information processing device performs a process.

Figure 5:
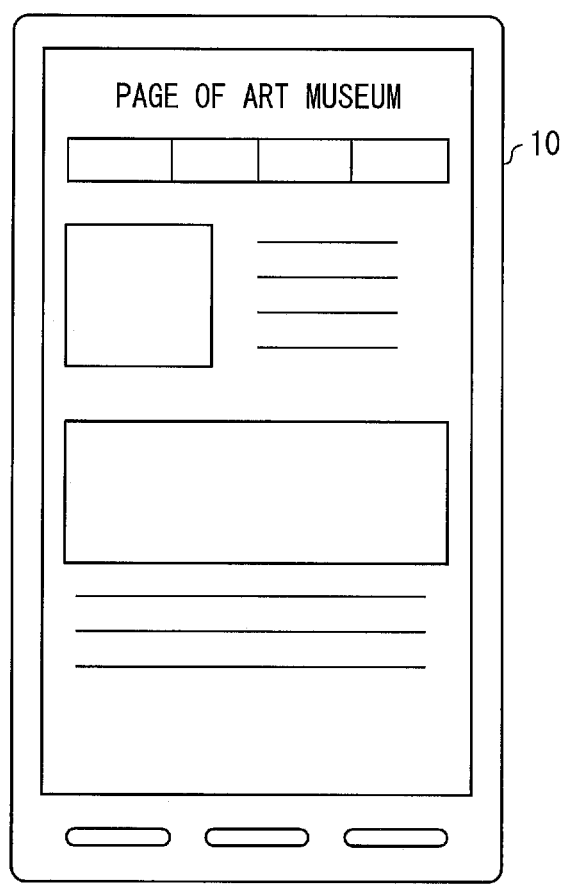

FIG. 5 is a view schematically illustrating an example process performed by the smartphone after the smartphone receives the setting information illustrated in (c) of FIG. 4.

Figure 6:
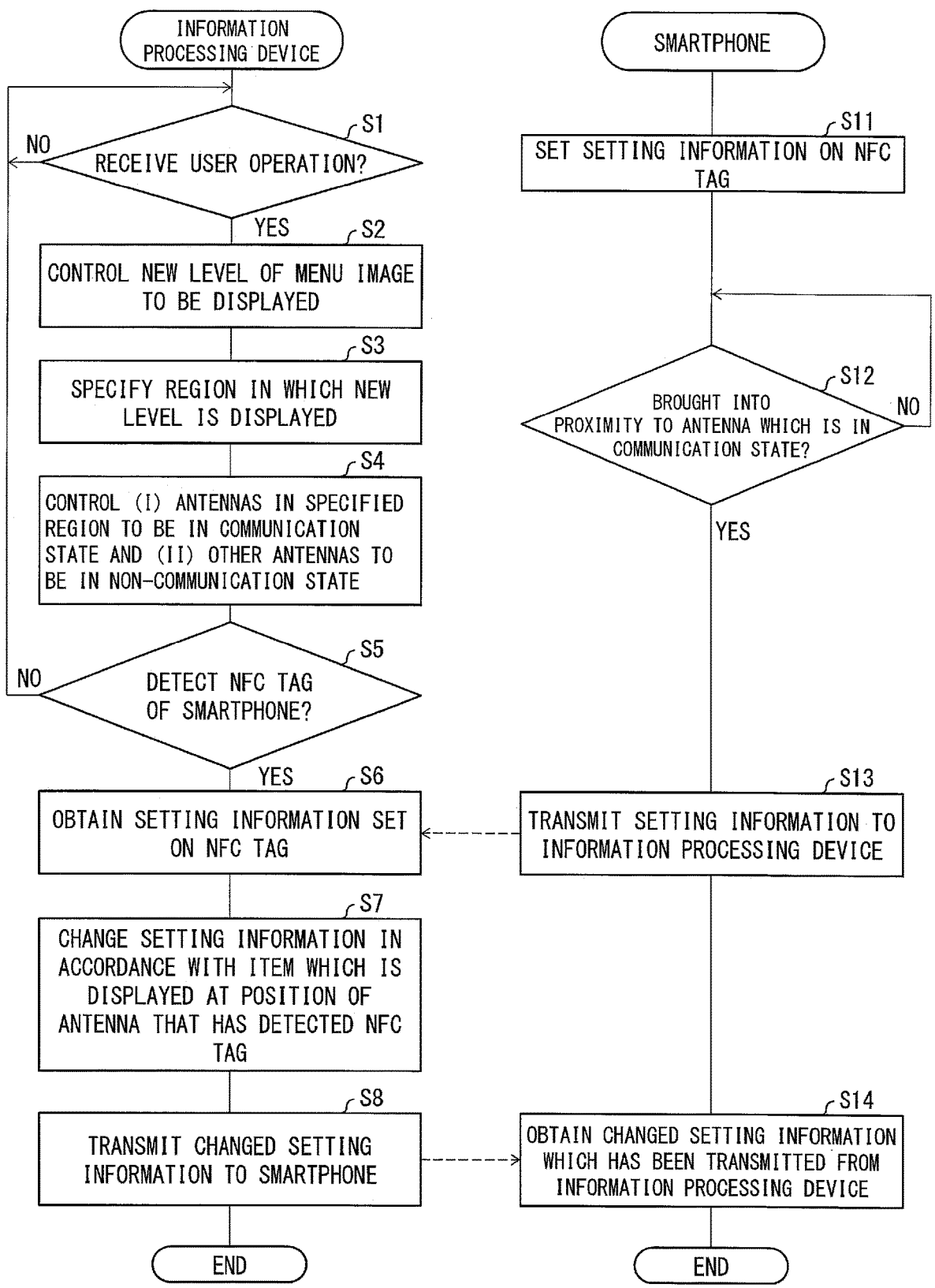

FIG. 6 is a flowchart illustrating an example of the flow of the antenna control process of Embodiment 1.

Figure 7:
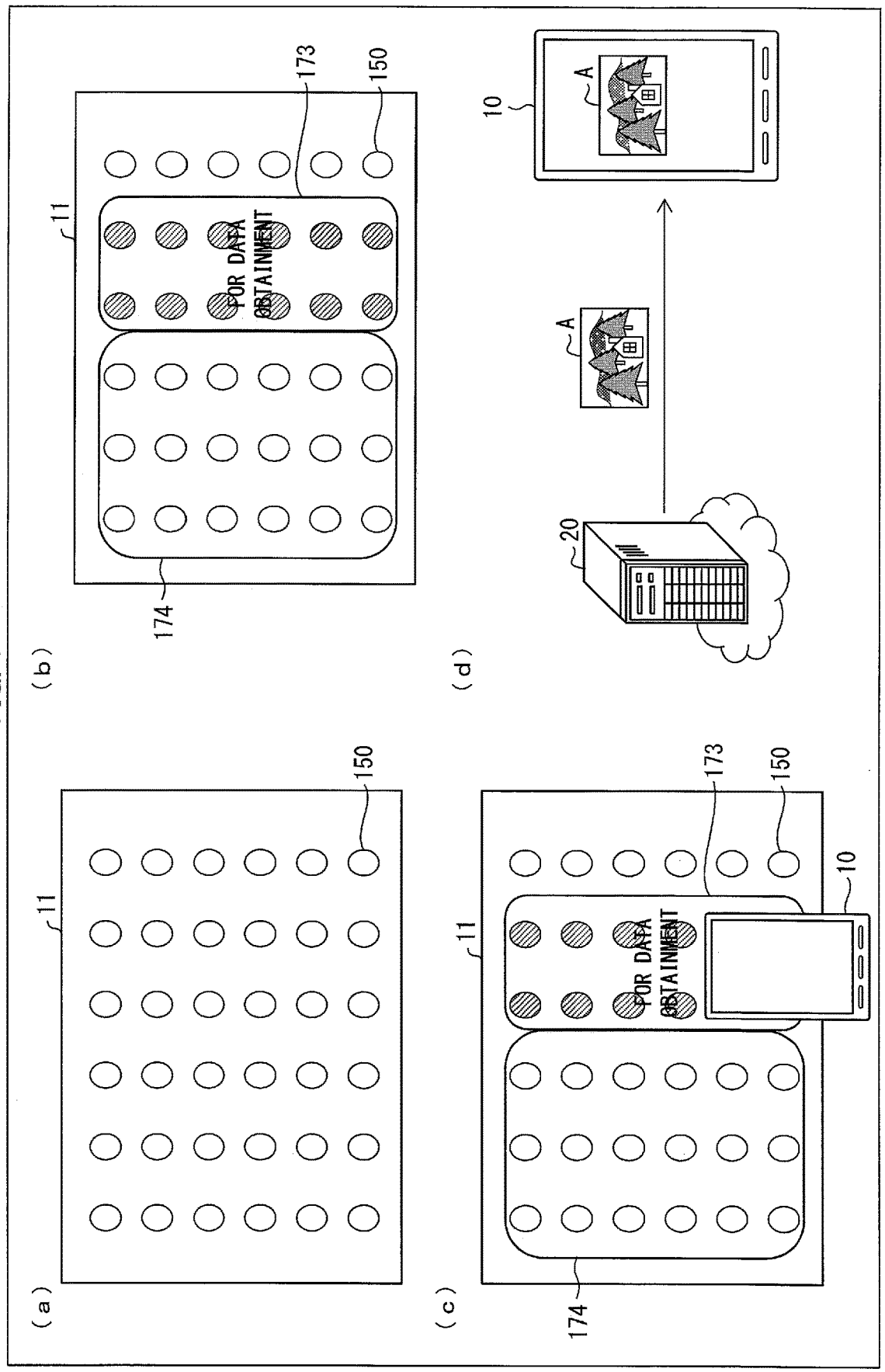

(a) through (e) of FIG. 7 are transition diagrams each illustrating an example of a how of an antenna control process of Embodiment 2. (d) of FIG. 7 is a view schematically illustrating a process performed subsequent to (e) of FIG. 7.

Figure 8:
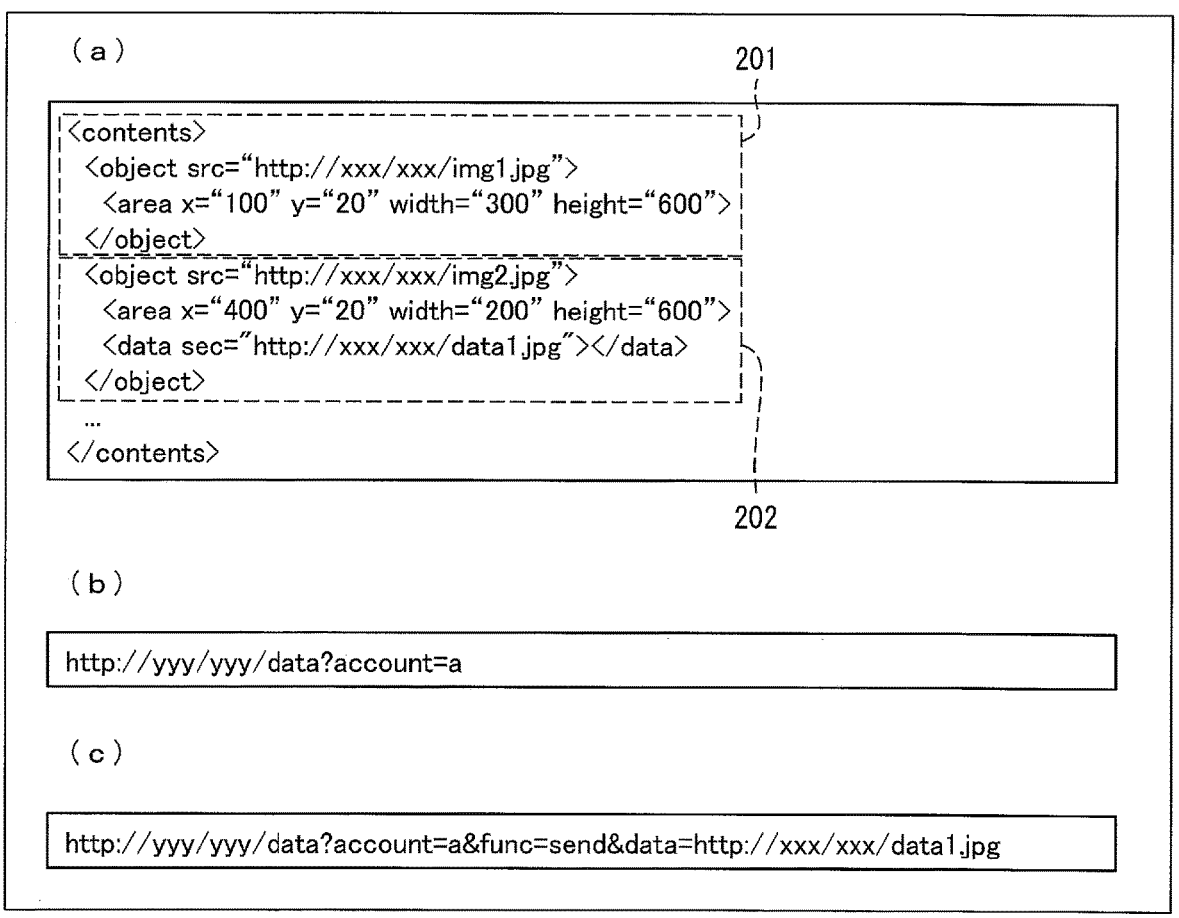

(a) of FIG. 8 is a view illustrating a specific example of a script for display of a content image illustrated in FIG. 7. (b) of FIG. 8 is a view illustrating setting information transmitted from a smartphone, illustrated in (c) of FIG. 7, to an information processing device. (c) of FIG. 8 is a view illustrating setting information transmitted to the smartphone, illustrated in (c) of FIG. 7, after the information processing device performs a process.

Figure 9:
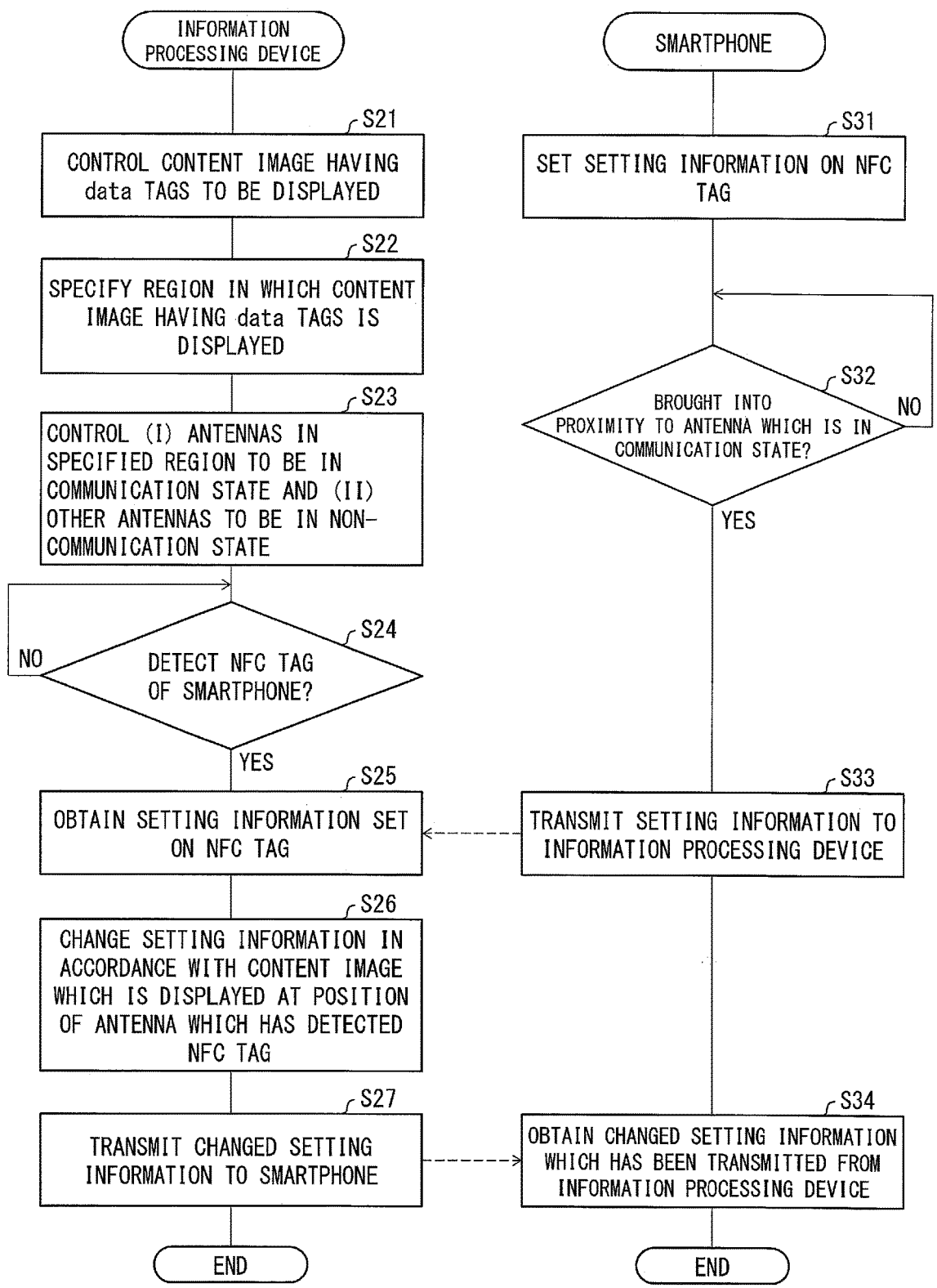

FIG. 9 is a flowchart illustrating an example of the flow of the antenna control process of Embodiment 2.

Figure 10:
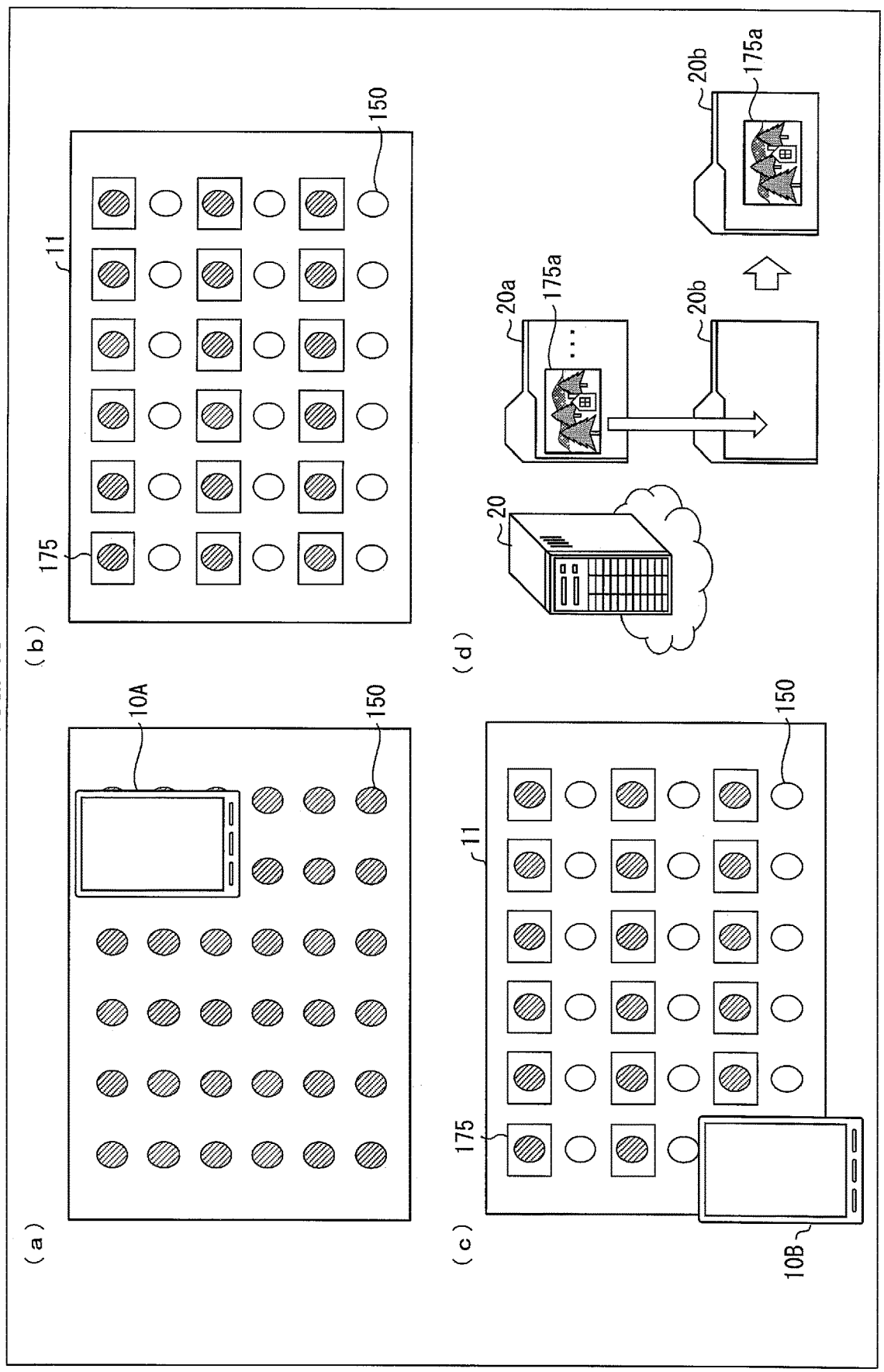

(a) through (c) of FIG. 10 are transition diagrams each illustrating an example of a flow of an antenna control process of Embodiment 3. (d) of FIG. 10 is a view schematically illustrating a process performed subsequent to (c) of FIG. 10.

(a) of FIG. 11 is a view illustrating setting information transmitted from a smartphone, illustrated in (a) of FIG. 10, to an information processing device, (b) of FIG. 11 is a view illustrating setting information transmitted from the smartphone, illustrated in (c) of FIG. 10, to the information processing device, (c) of FIG. 11 is a view illustrating setting information which the information processing device processes after performing near field communication with the smartphone illustrated in (a) of FIG. 10. (d) of FIG. 11 is a view illustrating a specific example of a script for display of pieces of photo-graph data illustrated in FIG. 10. (e) of FIG. 11 is a view illustrating setting information which the information processing device processes after performing near field communication with the smartphone illustrated in (c) of FIG. 10.

Figure 12:
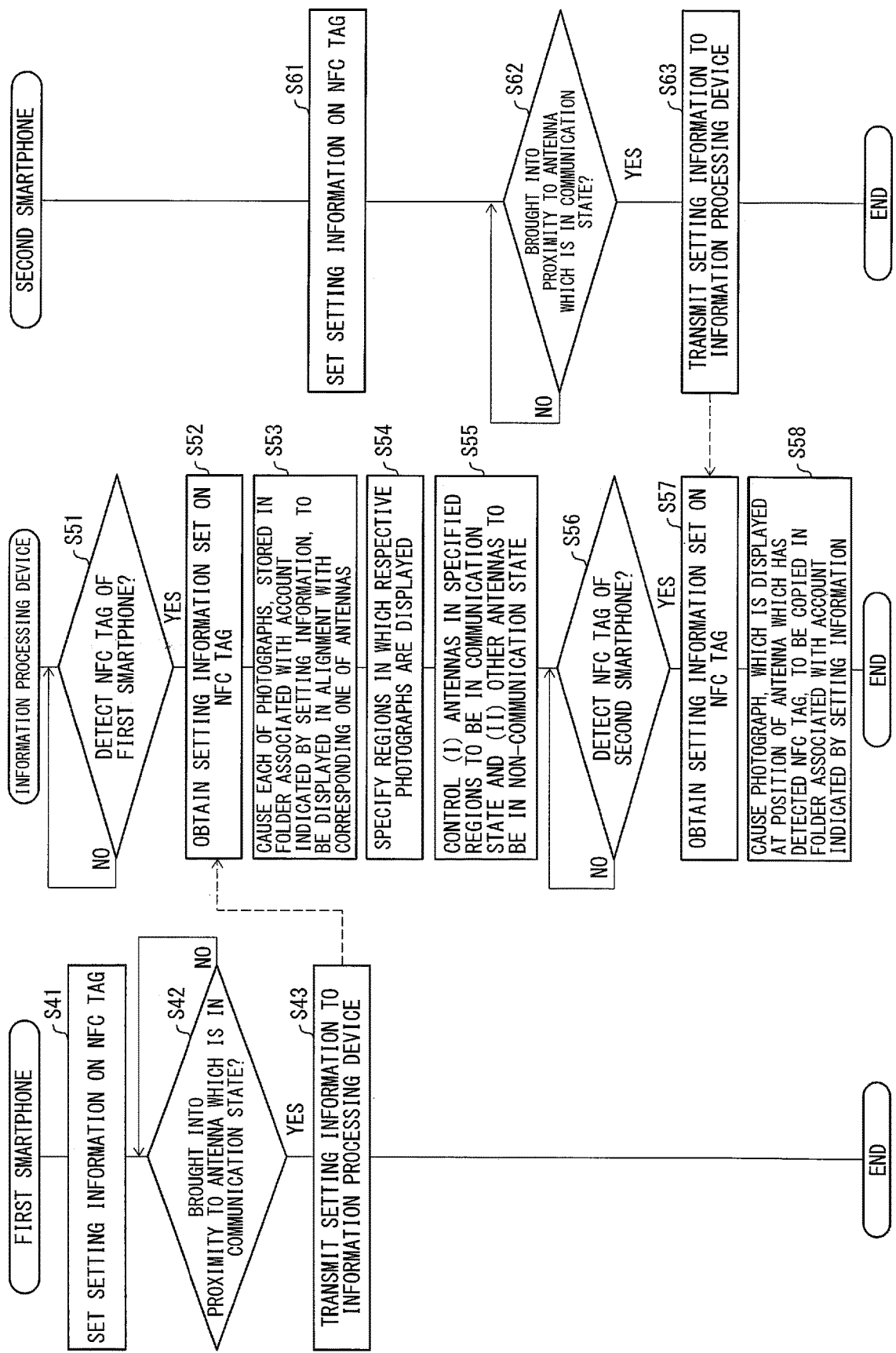

FIG. 12 is a flowchart illustrating an example of a flow of an antenna control process of Embodiment 3.

Figure 13:
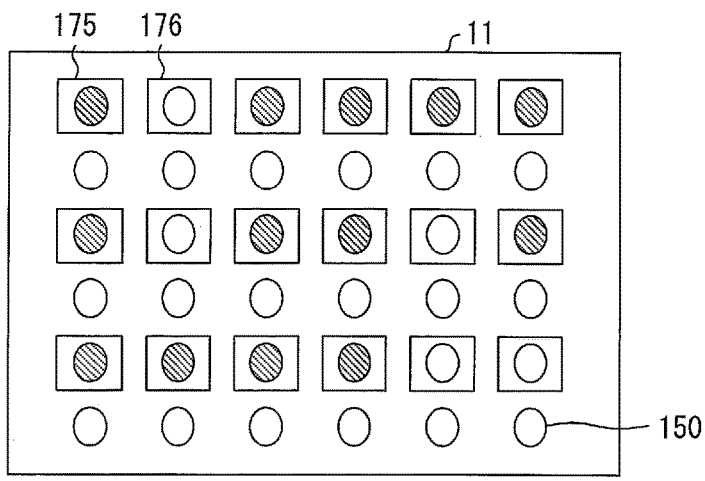

(a) of FIG. 13 is a view illustrating an example of display of pieces of photograph data in Embodiment 4. (b) of FIG. 13 is a view illustrating a specific example of a script for the display of the pieces of photograph data illustrated in (a) of FIG. 13.

Figure 14:
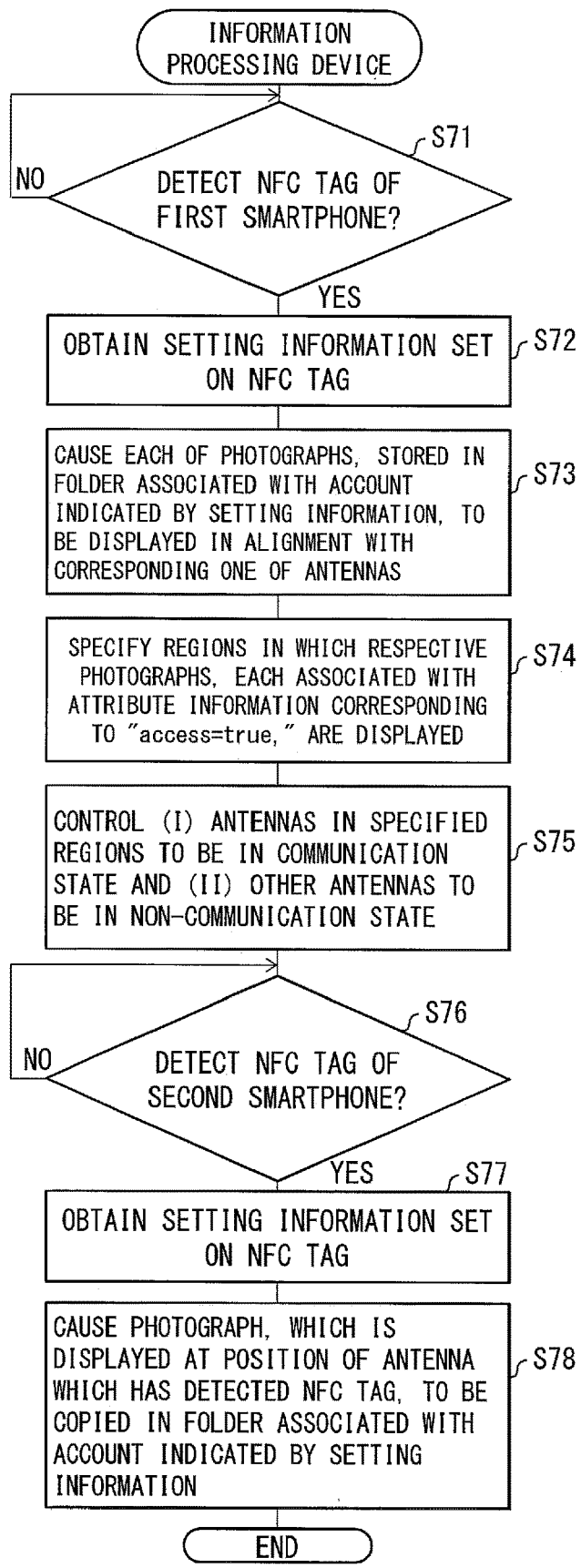

FIG. 14 is a flowchart illustrating an example of a flow of an antenna control process of Embodiment 4.

Figure 15:
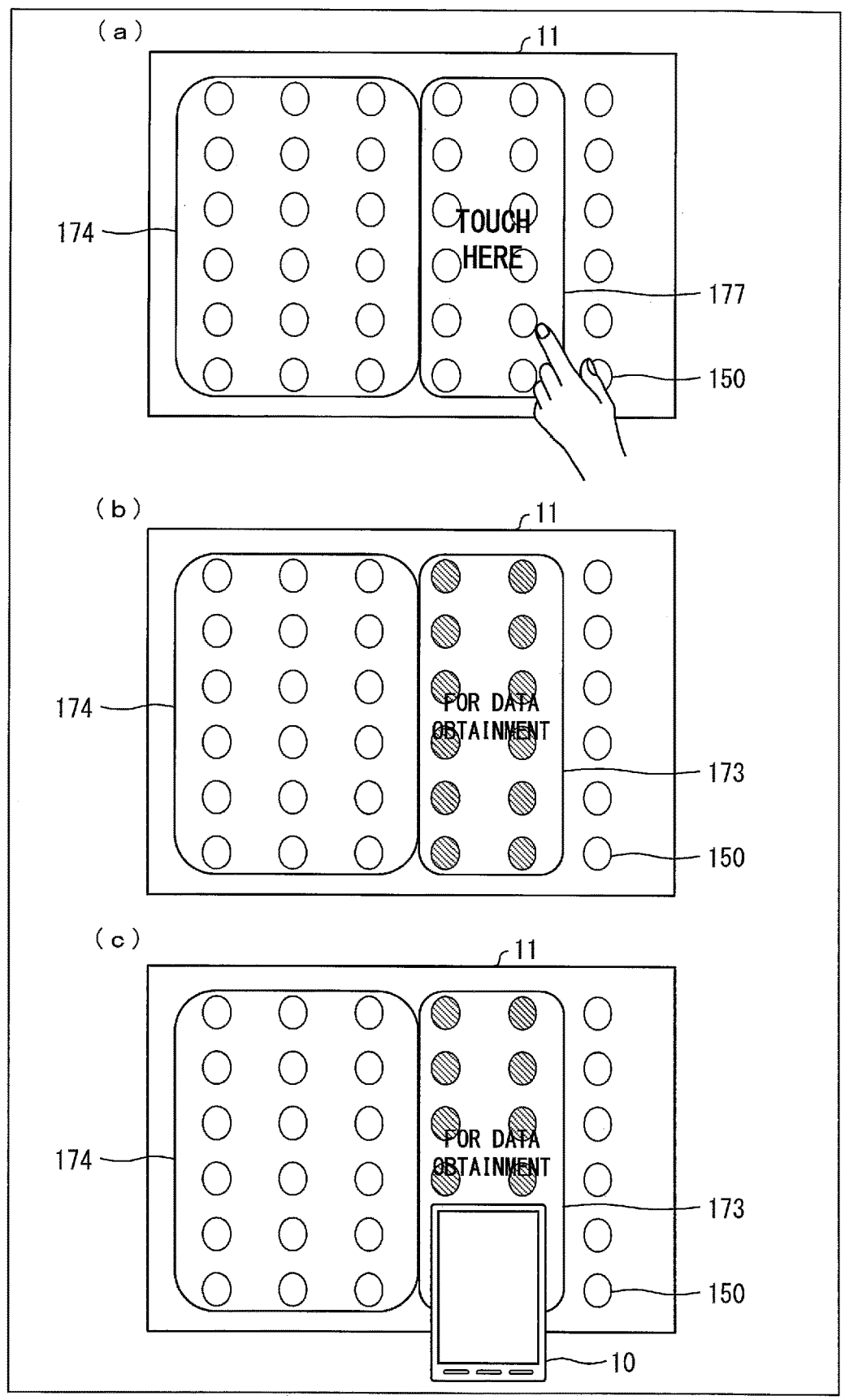

FIG. 15 is a transition diagram illustrating an example of a flow of an antenna control process of Embodiment 5.

Figure 16:
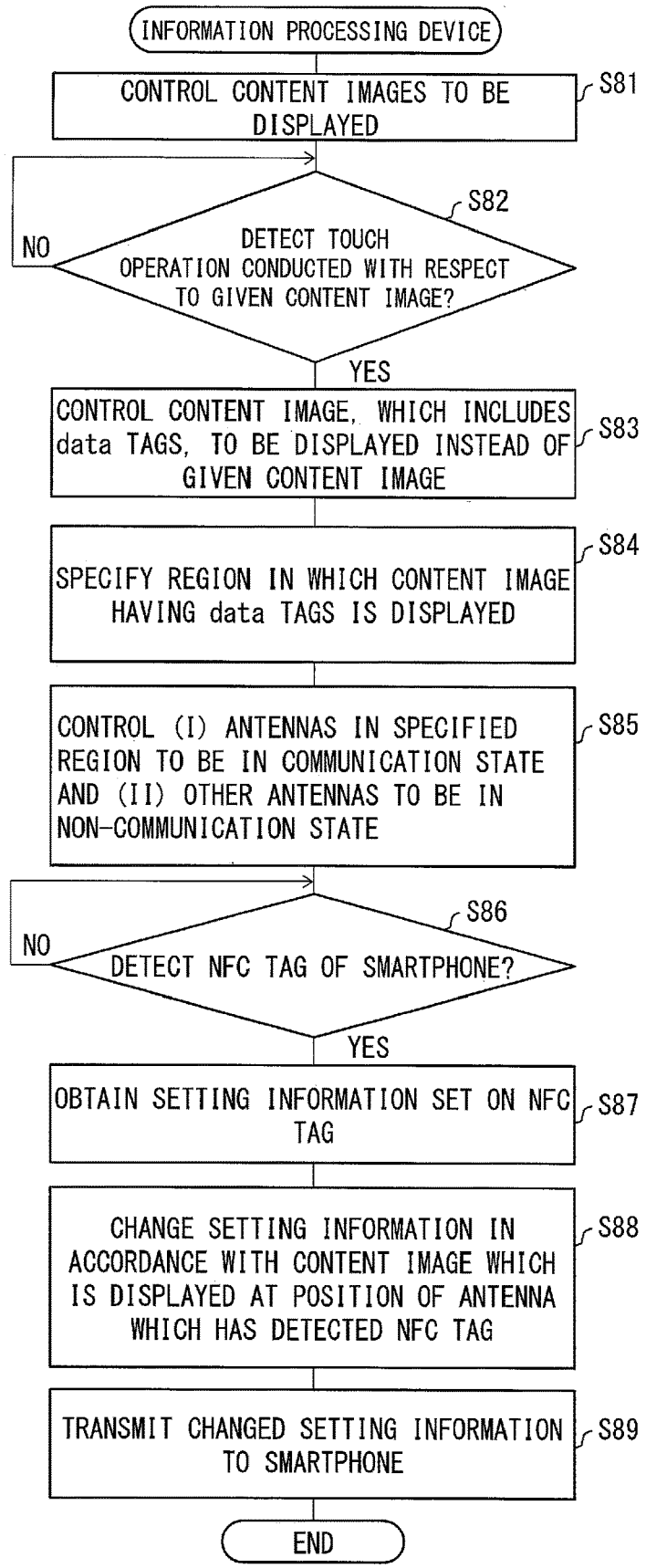

FIG. 16 is a flowchart illustrating an example of the flow of the antenna control process of Embodiment 5.

Figure 17:
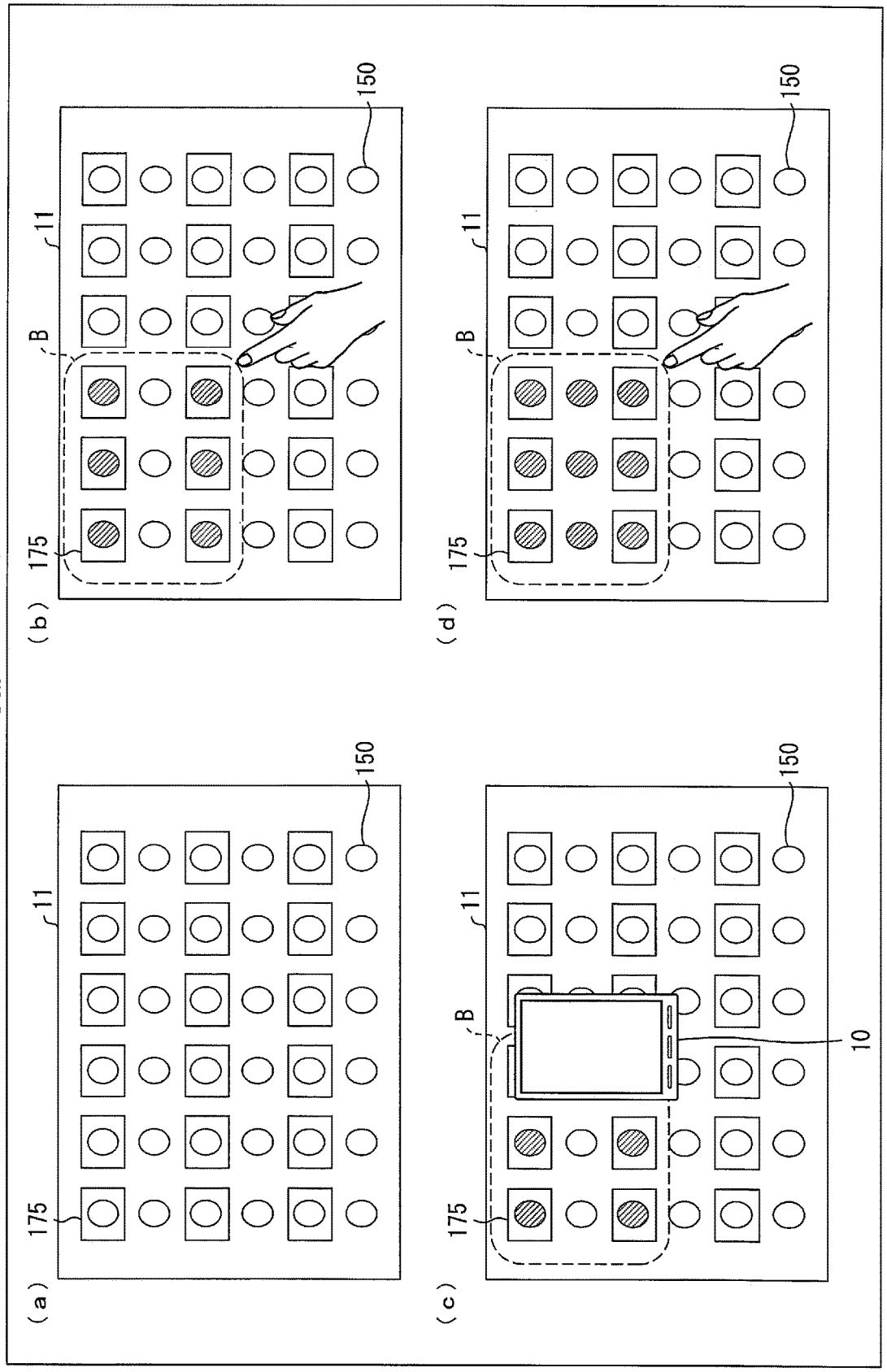

(a) through (c) of FIG. 17 are transition diagrams each illustrating an example of a flow of an antenna control process of Embodiment 6. (d) of FIG. 17 is a view illustrating another example of antenna control of Embodiment 6.

Figure 18:
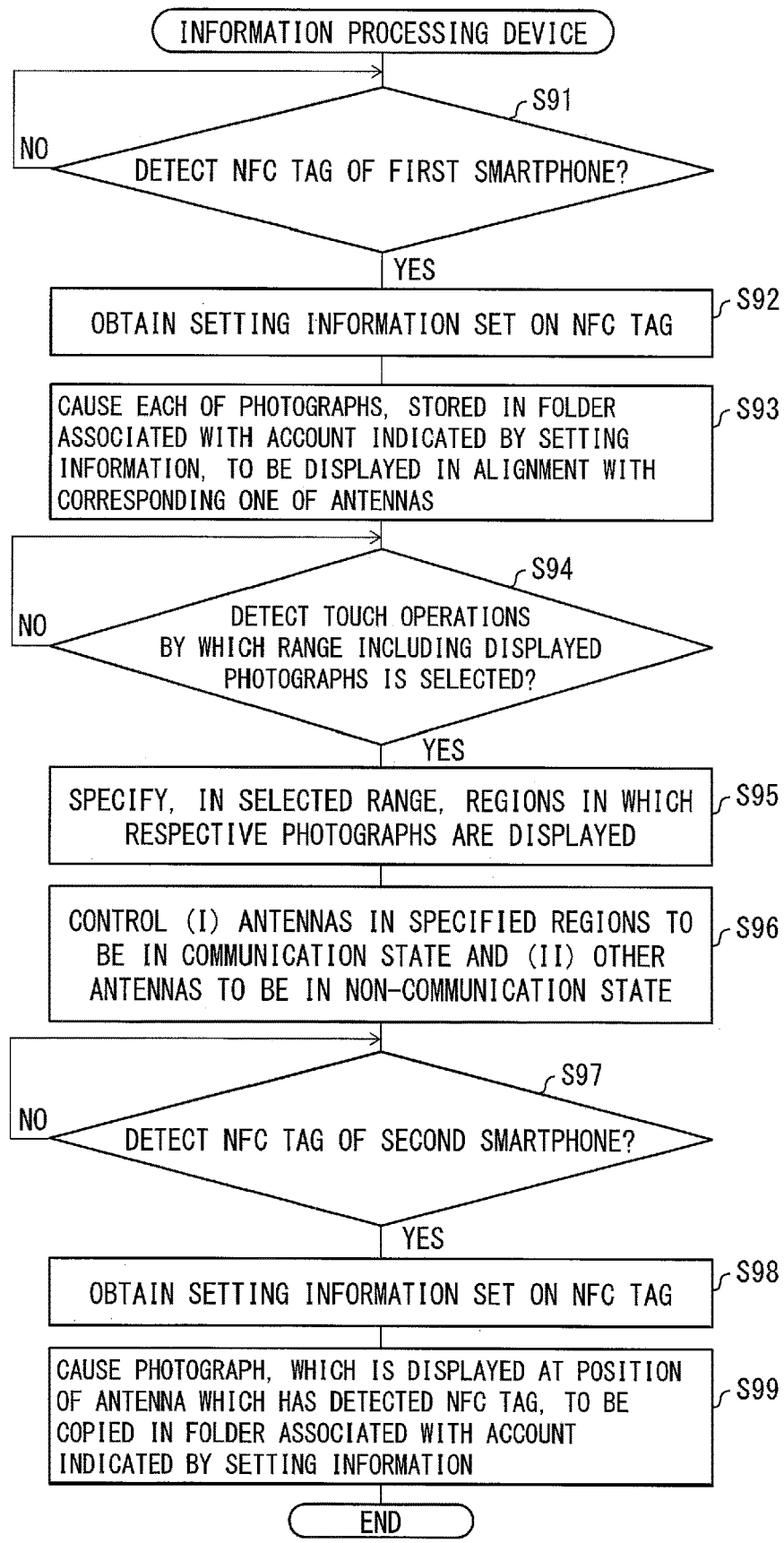

FIG. 18 is a flowchart illustrating an example of the flow of the antenna control process of Embodiment 6.

Figure 19:
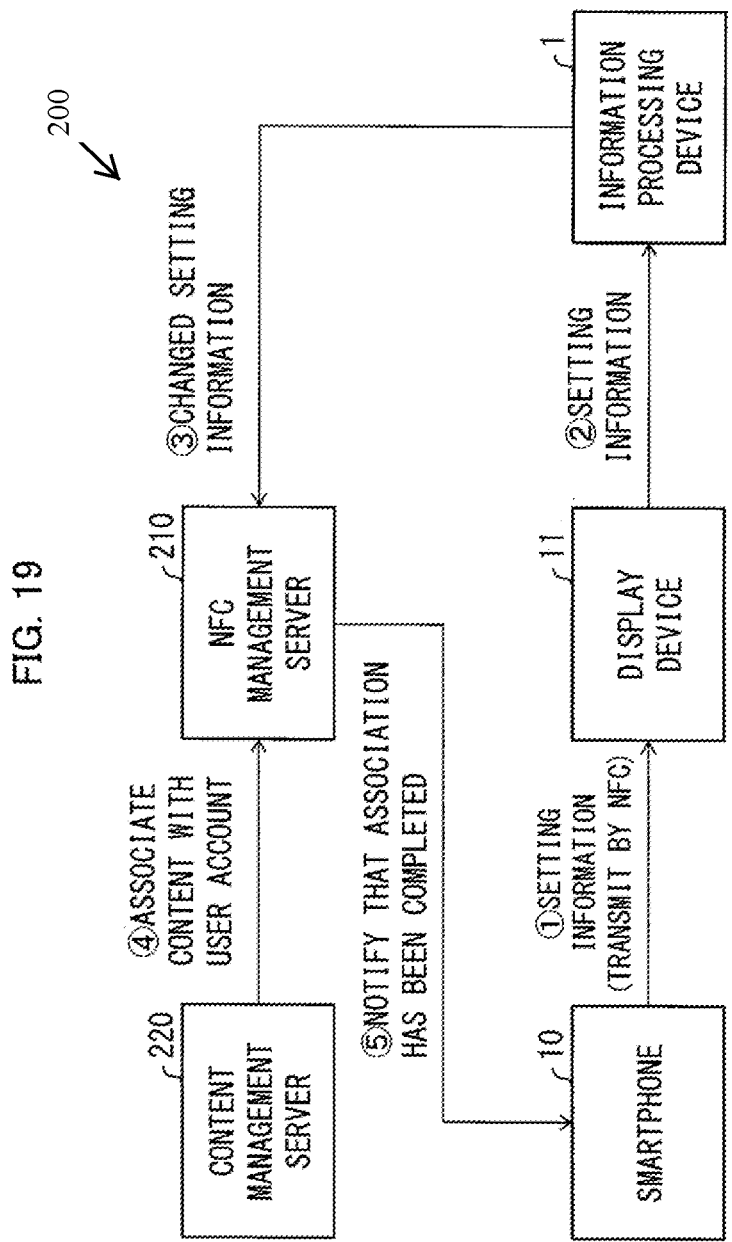

FIG. 19 is a view schematically illustrating an example of a near filed communication system of Embodiments 7 and 8.

Figure 20:
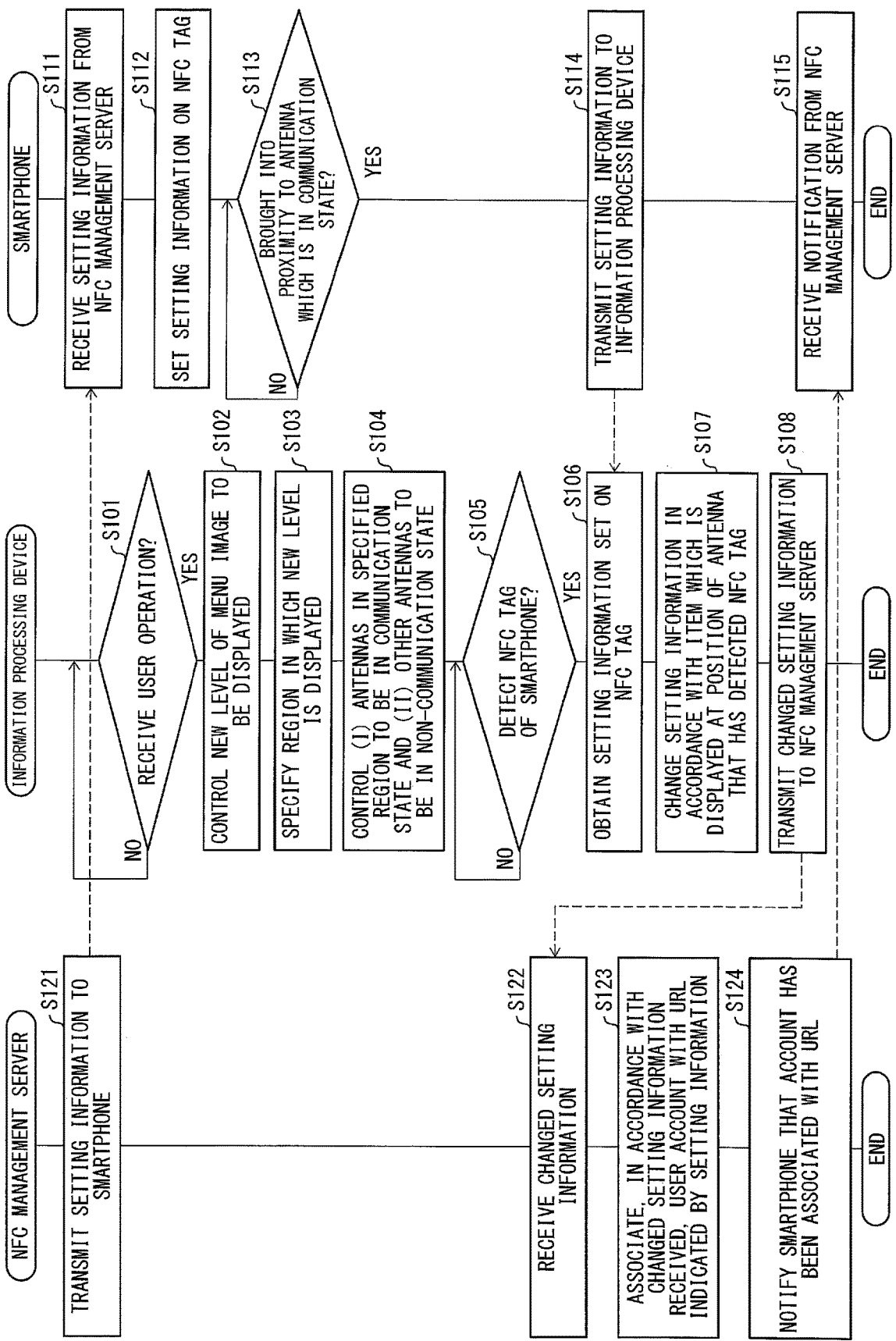

FIG. 20 is a flowchart illustrating an example of a flow of an antenna control process of Embodiment 7.

Figure 21:
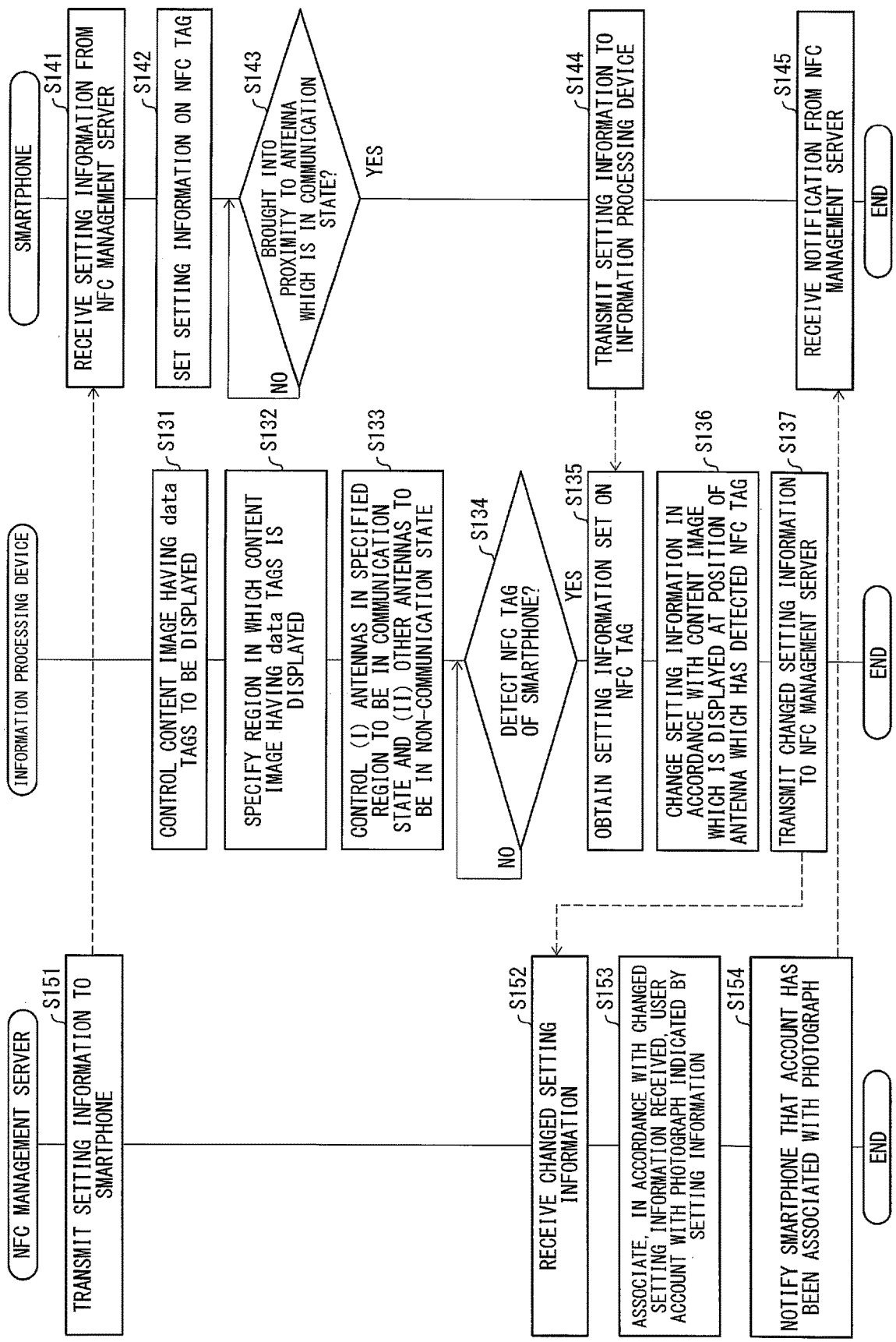

FIG. 21 is a flowchart illustrating an example of a flow of an antenna control process of Embodiment 8.

Figure 22:
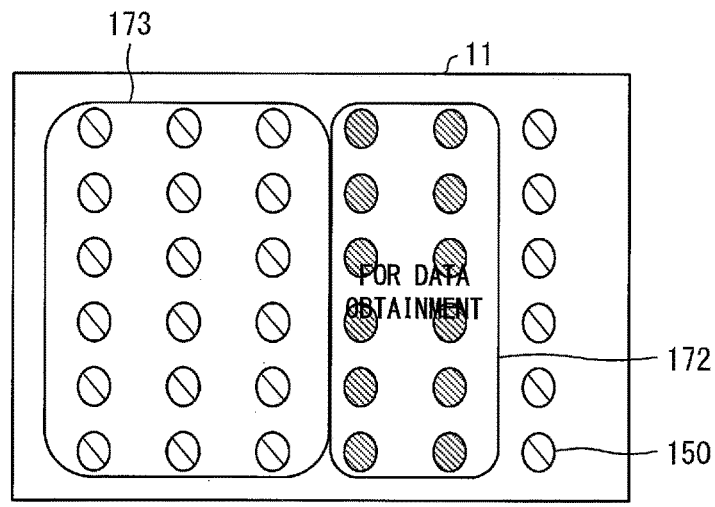

FIG. 22 is a view illustrating another example of antenna control of variations of Embodiments 1 through 8.

Figure 23:
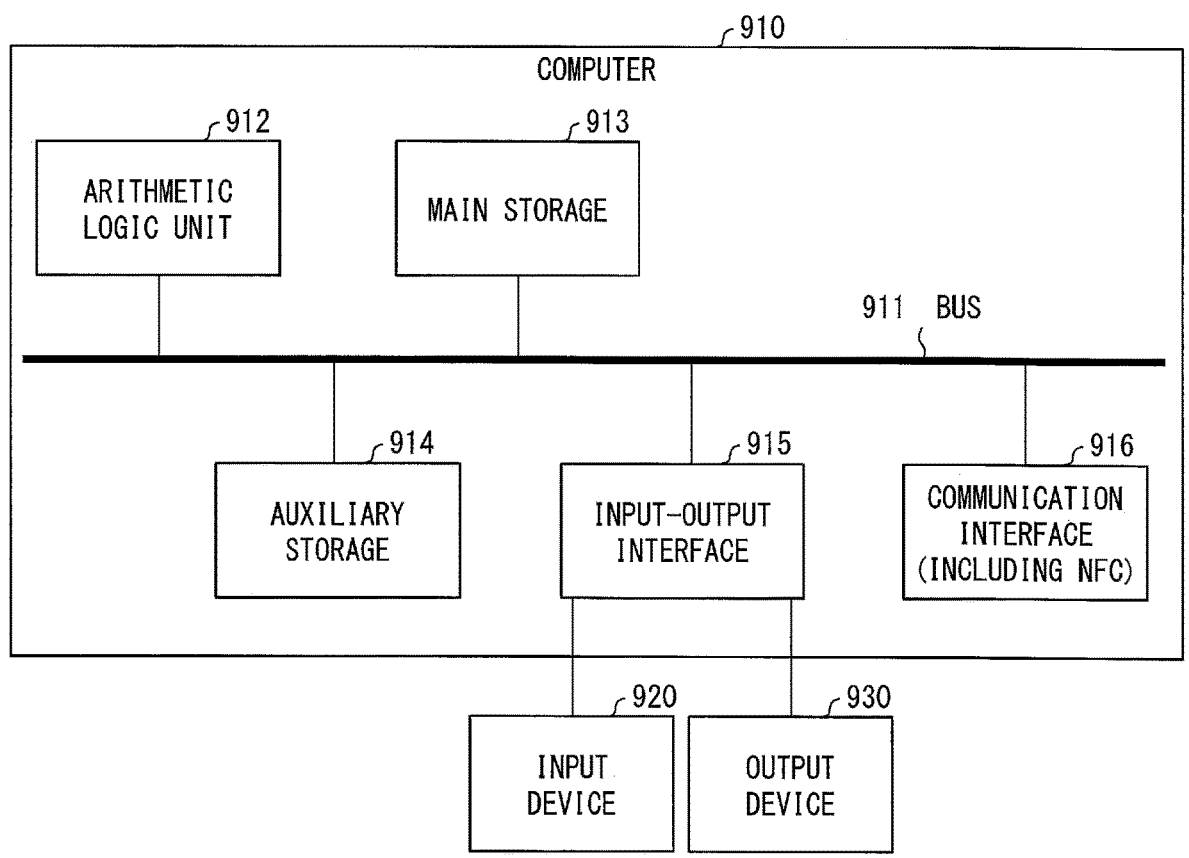

FIG. 23 is a block diagram illustrating an example of a configuration of a computer which is usable as the information processing device and or like.

DESCRIPTION OF EMBODIMENTS

Embodiment 1

The following description will discuss an embodiment of the present invention with reference to FIGS. 1 through 6.

(Near Field Communication System 100)

First, a near field communication system 100 will be described below with reference to FIG. 1, FIG. 1 is a block diagram illustrating an example configuration of a main part of each of an information pieces sing device 1, a display device 11, and a smartphone 10 (terminal device) which are included in the near filed communication system 100. Note that the main part of each of the information processing device 1, the display device 11, and the smartphone 10 will be described in detail later.

The display device 11 is a display device which displays an image (more specifically, an element image described later) in response to an instruction given by the information processing device 1. The display device 11 (later described in detail) includes a plurality of antennas each of which is provided in a display region of the display device 11 and via each of which external near field communication is performed. This allows a user to transmit/receive information by bringing a tag (hereinafter, referred to as an NFC tag) for near field communication (NFC) closer to the display region of the display device 11.

The information processing device 1 controls the display device 11 to display an image. Specifically, the information processing device 1 runs an application, and controls the display device 11 to display an image in accordance with a process of the application (specifically, an element image which forms a screen that is displayed in a display section in a case where the application is run). Examples of the image encompass each item of a menu image for causing a user to select a process to be performed, an image for forming a page (Web page) of a Web site that is held and operated by a server 20 (later described), and other images stored in the server 20. Note, however, that the image is not limited to the above examples. Further, the image also includes an image (e.g., a character string in a Web page) which is presented as a character string to a user when displayed. Hereinafter, the simple wording "image" indicates the above described element image.

Further, in accordance with an image displayed by the display device 11, the information processing device 1 controls a state of each of the plurality of antennas included in the display device 11. Note, here, that the "state of each of the plurality of antennas" includes two states, that is, a communication state and a non-communication state. The communication state is a state in which the each of the plurality of antennas allows external near field communication to be performed via the each of the plurality of antennas. The non-communication state is a state in which the each of the plurality of antennas allows external near field communication not to be performed via the each of the plurality of antennas. That is, each of the plurality of antennas of the display device 11 is controlled by the information processing device 1 so that the each of the plurality of antenna will be in either the communication state or the non-communication state in accordance with an image displayed by the display device 11.

In the example illustrated in FIG. 1, the information processing device 1 and the display device 11 are illustrated as respective separate devices. Note, however, that the information processing device 1 and the display device 11 can be integrated with each other so as to be one device. In this case, the information processing device 1 is configured to include a display corresponding to the display device 11.

The smartphone 10 is a mobile terminal which is used by a user of the near field communication system 100. The smartphone 10 includes an NFC tag. This allows the smartphone 10 to perform near field communication with the display device 11 (the information processing device 1).

The server 20 manages various pieces of information related to applications run by the information processing device 1. The server 20 transmits the various pieces of information to the information processing device 1 via an Internet network 30. For example, the server 20 can hold and operate a Web site. The information processing device 1 can control the display device 11 to display the Web site, by running an application for browse of the Web site.

Alternatively, for example, the server 20 can be a so-called online storage server which stores therein data on a user. The information processing device 1 can control the display device 11 to display an image (e.g., a photograph) in accordance with the data on the user, by running an application for managing online storage.

(Configuration of Main Part of Display Device 11)

Next, a configuration of the main part of the display device 11 will be described below with reference to FIGS. 1 and 2. (a) of FIG. 2 is an appearance diagram illustrating the display device 11, as viewed from the front, (b) of FIG. 2 is an appearance diagram illustrating the display device 11, as viewed from the side.

As illustrated in FIG. 1, the display device 11 includes an NFC communication section 15 (near field communication section) and a touch panel 16.

The NFC communication section 15 is a communication device for performing external near field communication. The NFC communication section 15 includes antennas 150. Each of the antennas 150 functions as a tag reader, that is, detects an NFC tag and transmits/receives information. Specifically, the NFC communication section 15 is a sheet-like member which is provided so as to be stacked on the touch panel 16 as illustrated in (b) of FIG. 2. Note that the NFC communication section 15 and the touch panel 16 (an input section 17 and a display section 18 which are described later) has a positional relation which is not limited to that in (b) of FIG. 2. For example, the NFC communication section 15 can be provided between the display section 18 and the input section 17 which is provided at the forefront.

In Embodiment 1 and subsequent Embodiments, the NFC communication section 15 is assumed to have a function of reading/writing data from/into the NFC tag 110 of the smartphone 10. Note that reading of data may also be referred to as "data reception," whereas writing of data may be referred to as "data transmission."

As illustrated in (a) of FIG. 2, the NFC communication section 15 includes the antennas 150. Note that, though the antennas 150 are arranged in a matrix pattern in (a) of FIG. 2, arrangement of the antennas 150 is not limited to this example. For example, the number of antennas 150 per line or per row in (a) of FIG. 2 can be changed and/or an interval between lines or rows in (a) of FIG. 2 can be changed. Alternatively, the antennas 150 can be randomly arranged in the NFC communication section 15.

The touch panel 16 is a member into which the input section 17 and the display section 18 are integrated with each other. Accordingly, an input region in which the input section 17 accepts an input is substantially identical to the display region in which the display section 18 displays an image. The input section 17 accepts an operation conducted with respect to the display region in which the display section 18 displays an image.

The input section 17 is an input device which allows a user to input an instruction signal with use of an indicator (finger, pen, etc.). Specifically, the input section 17 includes an input surface for accepting a touch (including an approach) of the indicator, and a touch sensor for detecting not only a touch of the indicator on the input surface but also a position (coordinates) at which the indicator touches the input surface. The touch sensor can be any sensor, provided that the sensor can detect contact/non-contact between the indicator and the input surface. The touch sensor can be, for example, a pressure sensor, a capacitive coupling sensor, or an optical sensor. The input section 17 supplies, to an application running section 21 (process performing section) (later described) of the information processing device 1, information (hereinafter, touch information) on a detected position (coordinates) at which the indicator has touched the input surface.

The display section 18 is a display device which displays, in the display region, information processed by the information processing device 1. The information here is displayed as an image (element image). For example, the display section 18 displays information processed by a display control section 22 (later described) or the like. The display section 18 is constituted by, for example, a liquid, crystal display (LCD).

Note that Embodiment 1 describes an example in which the input section 17 and the display section 18 are integrally formed so as to constitute the touch panel 16. Note, however, that an embodiment of the present invention is not limited to this example. In other words, the input section 17 and the display section 18 can be respective separate sections and, hi this ease, the input section 17 is an input device such as a mouse or a keyboard.

As has been described, the display device 11 includes the antennas 150 via each of which near field communication is performed. That is, by controlling a state of each of the antennas 150, it is possible to cause (i) some of the antennas 150 to be each in the communication state and (ii) the other of the antennas 150 to be each in the non-communication state. As has been described, each of the antennas 150 is controlled to be either in the communication state or in the non-communication state, in accordance with an image displayed by the display device 11. As such, even in a case where the smartphone 10 is brought into proximity to an antenna 150 which is in the non-communication state, near field communication, is not performed. This makes it possible to provide a display device capable of preventing communication which a user does not desire.

Further, since the antennas 150 are provided so as to be superimposed on the display section 18, the display region of the display section 18 can be regarded as a display region which is divided into a plurality of regions corresponding to the respective antennas 150. Then, it is possible to control the state of each of the antennas 150 included in the respective plurality of regions, in accordance with an image displayed in a corresponding one of the plurality of regions. With this, in a case where the antennas 150 included in the respective plurality of regions are controlled to be each in the communication state, a plurality of individuals are, for example, capable of obtaining data at once by near field communication. Therefore, such a configuration makes it possible to efficiently obtain data.

(Configuration of Main Part of Information Processing Device 1)

Next, a configuration of the main part of the information processing device 1 will be described below with reference to FIG. 1.

As illustrated in FIG. 1, the information processing device 1 includes a control, section 12, a storage section 13, and a network communication section 14.

The control section 12 integrally controls sections of the information processing device 1. The control section 12 includes an application running section 21, a display control section 22, a region specifying section 23 (region determining section), and an antenna control section 24.

The application running section 21 runs various applications stored in the information processing device 1. Specifically, the application running section 21 performs a process of the application 31 which has been read out from the storage section 13 (later described). More specifically, the application running section 21 (i) performs a process with respect to the application in accordance with touch information which has been supplied from the input section 17 of the display device 11 and (ii) supplies, to the display control, section 22, information (screen definition information) for defining a screen which is to be displayed in the display section 18 when the application is run. This causes the display section 18 to display an image in accordance with the process performed. The screen definition information is, for example, a script for generation of a screen which is to be displayed in the display section 18 when the application is run. That is, the screen definition information includes information (display position, size, etc.) necessary for display of an image. This allows the display control section 22 to control an image to be displayed in the display section 18 in accordance with the process performed by the application running section 21. Note that specific examples of the screen definition information will be described later. Further, the screen definition information is not limited to the above-described script. In other words, the screen definition information can be anything that defines a screen which is to be displayed in the display section 18 when the application is run.

Specifically, the application running section 21 generates the screen definition information, with reference to antenna position information 32 (later described) which is stored in the storage section 13. Specifically, the application running section 21 generates the screen definition information so that an image to be displayed in the display section 18 will have a size with which a display region of the image does not include any antenna 150 included in a display region of another image. Note that generation of the screen definition information is not limited to the above example. For example, provided that a display region of an image and an antenna(s) 150 are in 1:1 correspondence or 1:N (N is an integer of 1 or more) correspondence (provided that a process corresponding to the image is performed when the smartphone 10 is brought into the proximity to the antenna(s) 150), the image can be displayed at a position which does not include any antenna 150.

The image may be, for example, each item of a menu image for causing a user to select a process to be performed, an image for forming a page (Web page) of a Web site which is held and operated by the server 20, or an image corresponding to user's data stored in the server 20 for online storage. In other words, in a case where the image to be displayed is an image for forming a page (Web page) of a Web site which is held and operated by the server 20 or an image corresponding to user's data stored in the server 20 for online storage, the application running section 21 accesses the server 20 via the network communication section 14 and the Internet network 30, and supplies, to the display control section 22, the screen definition information in accordance with which a screen including the image as described above is to be displayed in the display section 18 of the display device 11.

Further, the application running section 21 also supplies, to the region specifying section 23, the screen definition information which the application running section 21 supplies to the display control section 22. This allows the region specifying section 23 to specify a region in accordance with the image which is to be displayed in the display section.

Further, in a case where application running section 21 receives, from the antenna control section 24, (i) information (setting information) which has been set on the NFC tag 110 of the smartphone 10 and (ii) position information of an antenna 150 via which the information has been received, the application running section 21 specifies an image displayed at a position indicated by the position information, and performs a process corresponding to the image thus specified. For example, when the application running section 21 receives the setting information from the antenna control section 24, the application running section 21 changes the setting information and transmits the setting information thus changed, to the smartphone 10 via the NFC communication section 15 (antenna 150). Note that the setting information will be later described in detail.

The display control section 22 controls the display section 18 to display an image (element image). Specifically, the display control section 22 controls the display section 18 to display an image in accordance with the screen definition information which has been supplied from the application running section 21.

The region specifying section 23 specifies a communication region which is a region in which an antenna(s) 150 is/are controlled to be in the communication state. Specifically, the region specifying section 23 specifies the communication region with reference to the screen definition information which has been supplied from the application running section 21. Then, the region specifying section 23 supplies, to the antenna control section 24, antenna control information indicative of the communication region thus specified. Note that specific details of the communication region will be described later.

The antenna control section 24 controls the state of each of the antennas 150. Specifically, in a case where the antenna control section 24 receives the antenna control information, the antenna control section 24 reads out antenna position information 32 (later described) from the storage section 13, and specifies (i) an antenna(s) 150 which is are included in the communication region indicated in the antenna control information and (ii) an antenna(s) 150 which is/are not included in the communication region. Then, the antenna control section 24 (i) controls, to be in the communication state, the antenna(s) 150 which is/are included in the communication region and (ii) controls, to be in the non-communication state, the antenna(s) 150 which is/are not included in the communication region.

Further, in a case where the antenna control section 24 receives, from the NFC communication section 15, the information obtained from the NFC tag 110, the antenna control section 24 supplies, to the application running section 21, (i) the information obtained from the NFC tag 110 together with (ii) the position information of an antenna 150 via which the information obtained from the NFC tag 110 has been obtained.

The storage section 15 is a storage device which stores therein various pieces of data which are to be used by the information processing device 1. The storage section 13 at least stores therein the application 31 and the antenna position information 32.

The application 31 is software to be run by the application running section 21. Specifically, the application 31 may be, for example, an application, for browse of a Web site or an application for management of online storage. However, the application 31 is not limited to these examples. Note that, a plurality of applications can be stored in the storage section 13.

The antenna position information 32 is information indicative of a position (coordinates) of each antenna 150 of the display device 11.

The network communication section 14 is a communication device for transmission/reception of information between the information processing device 1 and an external device (for example, the server 20) via the Internet network 30.

(Configuration of Main Part of Smartphone 10)

Next, a configuration of the main part of the smartphone 10 will be described below with reference to FIG. 1. As illustrated in FIG. 1, the smartphone 10 includes an NFC tag 110 (transmitting section), an information setting section 120, an application running section 130, and a storage section 140. Note that, though the smartphone 10 includes members (such as an input section, a display section, and a communication section) and functions which conventional smartphones have, such members and functions are less relevant to an embodiment of the present invention and, therefore, descriptions of the members and functions will be omitted here.

The NFC tag 110 is a communication device for performing external near field communication. On the NFC tag 110, information which a user desires to transmit to an external device (the information processing device 1) can be set. In a case where the user brings the smartphone 10 into proximity to the NFC communication section 15 of the display device 11 after such information is set on the NFC tag 110, near field communication is performed, so that the information (hereinafter, referred to as setting information) set on the NFC tag 110 is transmitted to the information processing device via the display device 11. The NFC tag 110 also receives information which is transmitted from the information processing device 1 via the NFC communication section 15 of the display device 11.

The information setting section 120 sets the setting information on the NFC tag 110. The information setting section 120 sets the setting information on the NFC tag 110, in accordance with an instruction given by the application running section 130. The setting information differs depending on an application run by the application running section 130. One specific example of the setting information is a character string (folder pass, URL, or the like) indicative of a given region (folder) in the storage section 140 of the smartphone 10 or a storage section of am external server.

The application running section 130 runs various applications which are stored in the smartphone 10. Specifically, the application running section 130 performs a process of an application 141 which has been read out from the storage section 140 (later described). More specifically, the application running section 130 gives an instruction to the information setting section 120, in accordance with an instruction given by a user via the input section (not illustrated). The instruction here is an instruction to set the setting information in accordance with the application 141 which is being run. The application running section 130 also performs a process with respect to the application 141, in accordance with an instruction given by a user, and causes the display section (not illustrated) of the smartphone 10 to display a screen in accordance with the process being performed.

The storage section 140 is a storage device which stores therein various pieces of data which are to be used by the smartphone 10. The storage section 140 at least stores therein the application 141.

The application 141 is software to be run by the application running section 130. Specifically, the application 141 may be, for example, an application for browse of a Web site, or an application for management of online storage. However, the application 31 is not limited to these examples. Note that, a plurality of applications can be stored in the storage section 140.

Note that the smartphone 10 is described in Embodiment 1 as one example of a device for performing near field communication with the display device 11. Specifically, the device for performing near field communication with the display device 11 is not limited to the smartphone 10, provided that the device has an NFC tag. For example, the device for performing near field communication with the display device 11 can be a card which has an NFC tag. In this case, a user can set, on the NFC tag, setting information by use of an external device.

(Specific Example of Antenna Control Process)

Next, a specific example of an antenna control process in accordance with Embodiment 1 will be described below with reference to FIGS. 3 through 5. FIG. 3 is a transition diagram illustrating an example of a flow of the antenna control process of Embodiment 1. (a) of FIG. 4 is a view illustrating a specific example of a script for display of a menu image illustrated in FIG. 3. (b) of FIG. 4 is a view illustrating setting information transmitted from the smartphone 10 to the information processing device 1. (c) of FIG. 4 is a view illustrating selling information trans mined to the smart phone 10, after the information processing device 1 performs a process. FIG. 5 is a view schematically illustrating a screen displayed by the smartphone 10 in a case where setting information received from the information processing device 1 is accessed.

In Embodiment 1, the application running section 21 of the information processing device 1 runs an application 31 for tourist information, and causes a screen related to the application 31 to be displayed by the display device 11.

First, the application running section 21 supplies screen definition information to the display control section 22 so that the display device 15 (the display section 18) displays a first level 170 of a menu image for causing a user to select a content item. As illustrated in (a) of FIG. 3, in accordance with the screen definition information, the display control section 22 controls the display section 18 to display the first level 170. The first level 170 here includes content items ("meals", "sightseeing", "souvenirs", and "accommodations") each indicative of an overview of user's target in the user's present tourist site.

Further, the application running section 21 also supplies the screen definition information to the region specifying section 23. With reference to the screen definition information, the region specifying section 23 specifies, as a communication region, a region (hereinafter, display region) in which the first level 170 is displayed. The region specifying section 23 then supplies, to the antenna control section 24, antenna control information indicative of the communication region thus specified.

The antenna control section 24 specifies (i) antennas 150 which are included in the communication region and (ii) the other antennas 150 which are not included in the communication region, with reference to the antenna control information supplied from the region specifying section 23. The antenna control section 24 (i) controls, to be each in the communication state, the antennas 150 which are included in the communication region, that is, in the display region of the first level 170 and (ii) controls, to be each in the non-communication state, the other antennas 150 which are not included in the communication region. Note that in Embodiments including Embodiment 1, each antenna 150 patterned by oblique lines indicates an antenna 150 which is in the communication state, whereas each antenna 150 which is not patterned (which is blank) indicates an antenna 150 which is in the non-communication state. That is, as illustrated in (a) of FIG. 3, in a state where the first level 170 is being displayed, merely antennas 150 at a position at which the first level. 170 is displayed are in the communication state.

In this case, in a case where a user selects, by a touch operation (input operation), one content item ("sightseeing" in (a) of FIG. 3) out of the content items included in the first level 170, a second level 171 corresponding to the content item thus selected is displayed. Specifically, the application running section 21 supplies, in accordance with information on a position at which a user makes a touch operation, the screen definition information to the display control section 22 and the region specifying section 23.

The display control section 22 then controls the display section 18 to display the second level 171 in accordance with the screen definition information thus received. Specifically, the display control section 22 controls the display section 18 to display the second level 171, by performing a process in accordance with the script as illustrated in (a) of FIG. 4 that is the screen definition information. Note that the script illustrated in (a) of FIG. 4 is one example of the screen definition information, and the screen definition information is not limited to this example. In accordance with the screen definition information received, the display control section 22 can control display such that a level (hereinafter, referred to as an active level; the second level 171 in (b) of FIG. 3) in a state ready to receive an operation from a user is displayed in a different manner from the other levels). For example, the display control section 22 can control an active level to be displayed in a color different from a color in which the other level(s) is/are displayed.

Note that the second level 171 in eludes content items associated with the content item selected at the first level 170. The content items of the second level 171 each indicate a specific place. For example, in a case where a user selects "sightseeing" at the first level 170, places suitable for sightseeing ("shrine", and "art museum") are displayed at the second level 171 as illustrated in (b) of FIG. 3.

Meanwhile, with reference to the screen definition information received, the region specifying section 23 specifies, as a communication region, a display region of the second level 171. The region specifying section 23 then supplies, to the antenna control section 24, antenna control information indicative of the communication region thus specified. The antenna control section 24 (i) controls, to be each in to be in the communication state, antennas 150 which are included in the display region of the second level 171 and (ii) controls, to be each in the non-communication state, the other antennas 150 which are not included in the display region of the second level 171.

Specifically, in a case where the screen definition information is arranged such that, as described above, a currently active level is displayed in a color different from a color(s) in which the other level(s) is/are displayed, it is possible to control, to be each in the communication state, merely the antennas 150 which are included in a region in which the second level 171 serving as an active level is displayed, merely with reference to the screen definition information received.

Note that an example in which merely an antenna(s) 150 which is/are included in a region in which an active level is displayed is/are controlled to be in the communication state is not limited to the above example. For example, the antennas 150 can be controlled so that an antenna(s) 150 in the communication state will be only an antenna(s) 150 in a display region of a level which is displayed latest out of all levels being displayed.

In a case where a user selects, by a touch operation, an item 172 indicating "art museum" in the above case, a Web page of the art museum is displayed in the display section 18 as illustrated in (c) of FIG. 3. Specifically, in a case where the application running section 21 receives information, on a position at which the touch operation is made, the application running section 21 obtains the Web page of the art museum from the server 20 via the network communication section 14 and the Internet network 30. The application running section 21 then supplies, to the display control section 22, screen definition information in accordance with which the Web page is to be displayed. Consequently, the display control section 22 controls the display section 18 to display the Web page of the art museum in accordance with the screen definition information received.

Meanwhile, in a case where a user brings the smartphone 10 closer to any one of the antennas 150 which are included in the display region of the item 172 indicative of the "art museum" as illustrated in (d) of FIG. 3, the any one of the antennas 150 obtains setting information from the NFC tag 110 of the smartphone 10. Specifically, the any one of the antennas 150 obtains setting information indicating a given folder in the smartphone 10 as illustrated in (b) of FIG. 4, and supplies the setting information to the antenna control section 24 of the information processing device 1. The antenna control section 24 supplies, to the application running section 21, the setting information together with position information on the any one of the antennas 150 which one has obtained the setting information. Note that the setting information is not limited to the above example illustrated in (b) of FIG. 4.

The application running section 21 processes the setting information thus received. Specifically, in accordance with the item 172 displayed in a position indicated by the position information received, the application running section 21 changes the setting information received. More specifically, the application running section 21 changes the setting information with use of the setting information indicative of the Web page of the art museum so that the URL of the Web page of the art museum is written subsequent to a character string indicative of a folder in the smartphone 10, as illustrated in (c) of FIG. 4. This makes it possible to browse the Web page of the art museum in an application (application for browse of a Web site) of the smartphone 10. The application running section 21 then transmits the setting information thus changed, to the smartphone 10 by near field communication via the NFC communication section 15 and the NFC tag 110. Note that the setting information changed is not limited to the example illustrated in (c) of FIG. 4.

This allows a user to browse the Web page of the art museum in the application for browse of the Web site which application is run by the smartphone 10, as illustrated in FIG. 5. For example, in a case where a user is browsing the Web page by causing the display device 11 to display the Web page, another user have to wait for browsing the Web page until the user finishes his/her browsing. This is because it takes a certain amount of time for the user to browse the Web page. In such a case, if setting information including the URL of the Web page can be transmitted to the smartphone 10 by near field communication as in Embodiment 1, each user can finish using the display device 11 for a shorter period of time as compared to a period of time necessary for each user to browse the Web page. This consequently allows for efficient use of the display device 11.

(Flow of Antenna Control Process)

Next, a flow of an antenna control process will be described below with reference to FIG. 6. FIG. 6 is the flowchart illustrating the flow of the antenna control process in accordance with Embodiment 1. Note that, in FIG. 6, it is assumed that the display device 11 is in a state in which the first level 170 is displayed as illustrated, in (a) of FIG. 3.

First, a user sets setting information on an NFC tag 110 of his/her own smartphone 10 (S11). Specifically, in accordance with an instruction given by the application running section 130, the information setting section 120 sets, on the NFC tag 110, setting information illustrated in (b) of FIG. 4. This causes the NFC tag 110 to be in a state in which the NFC tag 110 is capable of transmitting the setting information in a case where the NFC tag 110 is brought into proximity to an antenna 150 which is in the communication state (S12).

Meanwhile, the application running section 21 of the information processing device 1 is in a state in which the application running section 21 is ready to receive, via the input section 17 of the display device 11, touch information indicative of a position at which a user makes a touch operation (S1). In a case where the application running section 21 receives touch information (YES in S1), specifically, in a case where the application running section 21 receives touch information indicative of a touch on any one of content items at the first level 170, the application running section 21 supplies, to the display control section 22 and the region specifying section 23, screen definition information in accordance with which the second level 171 is displayed.

The display control section 22 then controls a new level of a menu image, that is, the second level 171 to be displayed in accordance with the screen definition information thus received (S2).

Further, in accordance with the screen definition information received, the region specifying section 23 specifies, as a communication region, a display region of the new level, that is, a display region of the second level 171 (S3, region determining step). The region specifying section 23 then supplies, to the antenna control section 24, antenna control information indicative of the communication region thus specified.

The antenna control section 24 specifies antennas which are included in the communication region indicated by the antenna control information received, and controls (i) each of the antennas 150 thus specified to be in the communication state and (ii) each of the other antennas 150 to be in the non-communication state (S4, antenna controlling step).

In the NFC communication section 18 of the display device 11, the antennas 150 which are each in the communication state are each ready to detect the NFC tag 110 included in the smartphone 10 (S5). Here, in a case where (i) the NFC tag 110 of the smartphone 10 is brought into proximity to any one of the antennas 150 which are each in the communication state (YES in S12) and (ii) the any one of the antennas 150 accordingly detects the NFC tag 110 (YES in S5), the NFC tag 110 transmits the setting information to the information processing device 1 via the any one of the antennas 150 (S13). Specifically, in a case where the NFC communication section 15 obtains the setting in form a lion via any one of the antennas 150 which are each in the communication state, the NFC communication, section 15 transmits the setting information to the antenna control section 24. In a case where the antenna control section 24 obtains the setting information (S6), the antenna control section 24 (i) supplies, to the application running section 21, the setting information thus received, (ii) specifies a position of the any one of the antennas 150 via which any one the NFC communication section 15 has obtained the setting information, and (iii) further supplies, to the application running section 21, position information indicative of the position thus specified.

In a case where the application running section 21 receives the setting information and the position information, the application running section 21 changes the setting information in accordance with the item 172 which is displayed at the position of the any one of the antennas 150 which any one has detected the NFC tag 110 (S7). Specifically, the application running section 21 specifies the item 172 displayed at the position indicated by the position information. The application running section 21 then changes the setting information with use of the URL of the Web page (for example, the Web page of the art museum) associated with the item 172 thus specified. Specifically, the application running section 21 changes the setting information as shown in (c) of FIG. 4 so that the URL of the Web page of the art museum is written subsequent to a character string indicative of a folder in the smartphone 10. This makes it possible to browse the Web page of the art museum in an application (application for browse of a Web site) of the smartphone 10.

Subsequently, the application running section 21 transmits, to the smartphone 10, the setting information thus changed (S8). Specifically, the application running section 21 transmits the setting information thus changed, to the smartphone 10 by near field communication via the NFC communication section 15. The smartphone 10 then obtains such changed setting information which has been transmitted by near field communication from the information processing device 1 (the application running section 21) (S14).

This allows a user to browse, on the smartphone 10, the Web page associated with the item 172 which has been displayed at the position of the any one of the antennas 150 to which any one the smartphone 10 is brought into proximity.

(Effects of Invention in Accordance with Embodiment 1)

As has been described, the information processing device 1 in accordance with Embodiment 1 specifies, as the communication region, the display region of the active level of the menu image. This causes, to be each in the communication state, merely the antennas 150 which are included in the display region of the active level. Accordingly, even in a case where a user brings the smartphone 10 into proximity to any one of the other antennas 150, no near field communication is performed. This makes it possible to prevent communication which a user does not desire.

Meanwhile, since the active level is selected by a user operation, the communication region is a region selected by a user. In other words, the antennas 150 which are included in the region selected by the user are in the communication state. Therefore, the user is capable of intuitively recognizing a region in which near field communication can be performed.

Embodiment 2

Next, the following description will discuss another embodiment of the present invention, with reference to FIGS. 7 through 9. Note that, for convenience, members identical in function to the respective members described in Embodiment 1 will be given respective identical reference numerals, and descriptions of the members will be omitted.

In Embodiment 2, a configuration will be described in which an antenna(s) controlled to be in a communication state is/are merely an antenna(s) 150 which is/are included in a display region of a content image whose given information is included in screen definition information, out of content images which are displayed on a display section 18.

(Specific Example of Antenna Control Process)

First, a specific example of an antenna control process in accordance with Embodiment 2 will be described below with reference to FIGS. 7 and 8. (a) through (c) of FIG. 7 are transition diagrams each illustrating an example of a flow of the antenna control process of Embodiment 2. (d) of FIG. 7 is a view schematically illustrating a process performed subsequent to (c) of FIG. 7. Further, (a) of FIG. 8 is a view illustrating a specific example of a script for display of a content image illustrated in FIG. 7. (b) of FIG. 8 is a view illustrating setting information transmitted from a smartphone 10 to an information processing device, (c) of FIG. 8 is a view illustrating setting information transmitted to the smartphone 10, after the information processing device 1 performs a process.

In Embodiment 2, an example will be described in which, as illustrated in (d) of FIG. 1, the smartphone 10 obtains, by near field communication, a piece of data (for example, photograph data A) which a server 20 has. In other words, in Embodiment 2, an application running section 21 of the information processing device 1 runs an application 31 for obtainment of data, and causes a screen related to the application 31 to be displayed by the display device 11.

As illustrated in (a) of FIG. 7, the application running section 21 instructs an antenna control section 24 to control all of antennas 150 to be each in a non-communication state before a process (hereinafter, data obtaining process) for obtaining data is performed.

Next, in a case where the application running section 21 obtains touch information which indicates that the data obtaining process is to be performed, the application running section 21 supplies, to a display control section 22, screen definition information in accordance with which a content image 173, for obtaining data, and a content image 174 are to be displayed by the display section 18. The content image 173 here is an image which shows a position to which the smartphone 10 is to be brought into proximity so as to obtain data by near field communication. The content image 174 is an image which causes near field communication not to be performed even in a case where the smartphone 10 is brought into proximity to the content image 174. Examples of the content image 174 are, for example, an image showing a description of the application 31 or a thumbnail image of the photograph data A to be obtained. However, the content image 174 is not limited in particular.

The display control section 22 controls the content image 173 and the content image 174 to be displayed, as illustrated in (b) of FIG. 7. Specifically, the display control section 22 controls the display section 18 to display the content image 173 and the content image 174, by performing a process in accordance with a script as illustrated in (a) of FIG. 8. Note that the script illustrated in (a) of FIG. 8 is one example and the screen definition information is not limited to this example.

The application running section 21 also supplies the screen definition information to a region specifying section 23. The region specifying section 23 specifies, as a communication region a display region of the content image 173, with reference to the screen definition information. The region specifying section 23 then supplies, to the antenna control section 24, antenna control information indicative of the communication region thus specified.

Here, a process of specifying the display region of the content image 173 as the communication region, which process is performed by the region specifying section 23, will be described in detail. In (a) of FIG. 8, a character string 201 is a character string for display of the content image 174, and a character string 202 is a character string for display of the content image 173. Unlike the character string 201, the character string 202 includes data tags. In other words, the content image 173 is an image for performing, by near field communication, a process indicated by a character string between the data tags. Specifically, the content image 173 is an image for performing a process of obtaining the photograph data A which is indicated by "data1.jpg" and which is stored in a folder in the server 20, which folder is indicated by the URL "http://xxx/xxx/" written on line 3 of the character string 202. More specifically, the content image 173 is an image for, in a case where the smartphone 10 is brought into proximity to an antenna 150 which is included in the display region of the content image 173, (i) obtaining, from the smartphone 10, setting information, illustrated in (b) of FIG. 8, which is indicative of a given folder in the smartphone 10, (ii) changing the setting information as illustrated in (c) of FIG. 8 so that a process of transmitting the photograph data A indicated by "data1.jpg" to the given folder in the smartphone 10 will be performed, and (iii) transmitting the above-described changed information to the smartphone 10.

The region specifying section 23 searches the screen definition information for the data tags, and specifies, as the communication region, the display region of the content image 173 which is to be displayed in accordance with the character string 202 including the data tags. In other words, the data tags are state specifying information for causing antennas, which are included in the display region of the content image indicated by the character string including the data tags, in a state in which information can be transmitted/received. Note that the state specifying information is not limited to data tags. Further, the region specifying section 23 supplies, to the antenna control section 24, the antenna control information indicative of the communication region thus specified.

The antenna control section 24 (i) controls, to be each in the communication state, antennas 150 which are included in the communication region indicated by the antenna control information received, that is, in the display region of the content image 173 illustrated in (b) of FIG. 7 and (ii) controls, to be each in the non-communication state, the other antennas 150 which are not included in the communication region.

Then, in a case where, as illustrated in (c) of FIG. 7, a user brings the smartphone 10 into proximity to any one of the antennas 150 which are included in the display region of the content image 173, the any one of the antennas 150 obtains the selling information from an NFC tag 110 of the smartphone 10. Specifically, the any one of the antennas 150 obtains the setting information, as illustrated in (b) of FIG. 8, indicative of a given folder in the smartphone 10, and supplies the setting information to the antenna control section 24 of the information processing device 1. The antenna control section 24 supplies, to the application running section 21, the setting information together with position information of the any one of the antennas 150 via which any one the setting information has been obtained. Note that the setting information is not limited to the above example illustrated in (b) of FIG. 8.

The application running section 21 processes the setting information received. Specifically, the application running section 21 changes the setting information thus received, in accordance with the content image 173 displayed at a position indicated by the position information received. More specifically, the application running section 23 changes the setting information as illustrated in (c) of FIG.

8 so that a process of transmitting the photograph data A, indicated by "data1.jpg," to the given folder in the smartphone 10 will be performed. The application running section 21 then transmits the above-described changed setting information to the smartphone 10 by near field communication via an NFC communication section 15 and the NFC tag 110. Note that the changed setting information is not limited to the above example illustrated in (c) of FIG. 8. Note also that, in Embodiment 2, the information processing device 1 and the smartphone 10 specify the server 20 in advance. Accordingly, even in a case where the changed setting information does not include the URL of the server 20, the above process can be performed.

In the way described above, the smartphone 10 can obtain the photograph data A from the server 20 and store in the given folder, as illustrated in (d) of FIG. 7. Note that such obtainment of the photograph data A can be transfer of the photograph data A from the server 20 to the smartphone 10 (in this case, the data is deleted from the server 20) or alternatively, copy of the photograph data A in the smartphone 10 (in this case, the data remains in the server 20).

(Flow of Antenna Control Process)

Next, a flow of an antenna control process will be described below with reference to FIG. 9. FIG. 9 is a flowchart illustrating the flow of the antenna control process in accordance with Embodiment 2. Note that, since processes performed in the steps S31 through S34 in the smartphone 10 are similar to respective processes performed in the steps S11 through S14 described in Embodiment 1, the processes will not be described below.

First, the display control section 22 having received screen definition information from the application running section 21 controls a content image having data tags to be displayed in accordance with the screen definition information (S25). Specifically, the display control section 22 controls the content image 173 to be displayed. Note that, in Embodiment 2, the display control section 22 controls the content image 174, which does not have a data tag, to be displayed together with the content image 173.

Next, with reference to the screen definition information, the region specifying section 23 having received the screen definition information from the application running section 21 specifies a region in which the content image having the data tags is displayed (S22). Specifically, the region specifying section 23 searches the screen definition information thus received for the data tags, and specifies, as the communication region, the display region of the content image 173 which is displayed in accordance with the character string 202 including the data tags. The region specifying section 23 then supplies, to the antenna control section 24, the antenna control information indicative of the communication region thus specified.

The antenna control section 24 specifies antennas which are included in the communication region indicated by the antenna control information received, and controls (i) each of the antennas 150 thus specified to be in the communication state and (ii) each of the other antennas 150 to be in the non-communication state (S23).

In the NFC communication section 15 of the display device 11, the antennas 150 which are each in the communication state are each thus ready to detect the NFC tag 110 included in the smartphone 10 (S24). Here, in a case where any one of the antennas 150 which are each in the communication state detects the NFC lag 110 (YES in S24), the NFC communication section 15 obtains the setting information via the any one of the antennas 150, and transmits the setting information to the antenna control section 24. In a case where the antenna control section 24 obtains the setting information (S25), the antenna control section 24 (i) supplies, to the application running section 21, the setting information thus received, (ii) specifies a position of the any one of the antennas 150 via which any one the NFC communication section 15 has obtained the setting information, and (iii) further supplies, to the application running section 21, position information indicative of the position thus specified.

In a case where the application running section 21 receives the setting information and the position information, the application running section 21 changes the selling information in accordance with the content image 173 which is displayed at the position of the any one of antennas which any one has detected the NFC tag 110 (S26). Specifically, the application running section 21 specifies the content image 173 which is displayed at the position indicated by the position information received. The application running section 21 then changes the setting information in accordance with the content image 173 thus specified. More specifically, the application running section 21 changes the setting information as illustrated in (c) of FIG. 8 so that a process of transmitting the photograph data A, indicated by "data1.jpg," to a given folder in the smartphone 10 is performed.

Note that, in Embodiment 2, the application running section 21 performs the same process, regardless of which antenna 150 has been used to obtain the setting information. Therefore, the antenna control section 24 can supply, to the application running section 21, merely the setting information obtained.

The application running section 21 then transmits the above-described changed setting information to the smartphone 10 (S27). Specifically, the application running section 21 transmits, to the smartphone 10, the changed setting information by near field communication via the NFC communication section 15.

The above allows the smartphone 10 to obtain the photograph data A from the server 20 and store the photograph data A in the given folder. In other words, merely by bringing the smartphone 10 into proximity to a position indicated by the content image 173, a user can obtain, from the server 20 by near field communication, data which the user wants.

Note that the screen definition information can have a plurality of character strings each of which includes data tags. In other words, a plurality of content images, each of which causes an antenna(s) 150 in a display region of the each of the content images to be in the communication state, can be displayed by the display section 18. Further, the application running section 21 can perform not only a process of obtaining data from the server 20 but also a billing process of payment for the data. Note that, in regard to the billing process by near field communication, a current technique is applicable and therefore the billing process will not be described here in detail.

(Effects of Invention in Accordance with Embodiment 2)

As has been described, the information processing device 1 in accordance with Embodiment 2 specifies, as the communication region, the display region of the content image 173 having the data tags. This makes it possible 10 specify, as the communication region, a display region of an image for which a process by near field communication is defined. Accordingly, since merely antennas 150 at a position at which a process by near field communication can be performed are caused to be each in the communication state, no near field communication is performed even in a case where the smartphone 10 is brought into proximity to the other antennas 150. This makes it possible prevent communication which a user does not desire.

Embodiment 3

Next, the following description will discuss another embodiment of the present invention, with reference to FIGS. 10 through 12. Note that, for convenience, members identical in function to the respective members described in Embodiment 1 or 2 will be given respective identical reference numerals, and descriptions of the members will be omitted.

In Embodiment 3, a configuration will be described in which data of one user is obtained by another user by near field communication. One possible specific example use case is a case in which a plurality of pieces of photograph data of a first user are displayed by a display device 11 and, out of the plurality of pieces of photograph data thus displayed, a second user obtains a piece(s) of photograph data which the second user wants.

(Specific Example of Antenna Control Process)

First, a specific example of an antenna control process in accordance with Embodiment 3 will be described below with reference to FIGS. 10 and 11. (a) through (c) of FIG. 10 are transition diagrams each illustrating an example of a flow of the antenna control process of Embodiment 3. (d) of FIG. 10 is a view schematically illustrating a process performed subsequent to (c) of FIG. 10. Further, (a) of FIG. 11 is a view illustrating setting information transmitted from a smartphone 10A to an information processing device. (b) of FIG. 11 is a view illustrating setting information transmitted from a smartphone 10B to an information processing device. (c) of FIG. 11 is a view illustrating setting information which the information processing device processes after performing near field communication with the smartphone 10A. (d) of FIG. 11 is a view illustrating a specific example of a script for display of the pieces of photograph data illustrated in FIG. 10. (e) of FIG. 11 is a view illustrating setting information which the information processing device processes after performing near field communication with a smartphone 10B.

In Embodiment 3, a case as illustrated in (d) of FIG. 10 will be described, in this example, a plurality of pieces of photograph data 175 of a first user are stored in a folder 20a of the first user in a server 20 for online storage, and, out of the plurality of pieces of photograph data 175 of the first user, a piece(s) of the photograph data 175a which the second user wants is/are copied in a folder 20b of the second user in the server 20. In other words, in Embodiment 3, an application running section 21 of an information processing device 1 runs an application 31 for obtainment of photograph data.

The application running section 21 first performs a process of causing the pieces of photograph data 175 of the first user to be displayed by the display device 11. As illustrated in (a) of FIG. 10, the application running section 21 instructs an antenna control section 24 to control all of antennas 150 to be each in a communication state. On receipt of such an instruction, the antenna control section 24 controls all of the antennas 150 to be each in the communication state.

In the above state, in a case where the first user brings his/her own smartphone 10A into proximity to any one of the antennas 150, the any one of the antennas 150 obtains setting information from an NFC tag 110 of the smartphone 10A. Hereinafter, setting information in a smartphone 10A is referred to as first setting information and setting information in a smartphone 10B is referred to as second setting information so that the setting information in the smartphone 10A and the setting information in the smartphone 10B will be distinguished from each other. Specifically, the any one of the antennas 150 obtains setting information as illustrated in (a) of FIG. 11, as the first setting information, and supplies the first setting information to the antenna control section 24 of the information processing device 1. The antenna control section 24 supplies, to the application running section 21, the first setting information thus received. Note that the first setting information in Embodiment 3 is information indicative of an account of the first user for an online storage service which a business operator operates with use of the server 20. Specifically, in the first setting information, the account of the first user is indicated by "account=a". Note, however, that the first setting information is not limited to the above example illustrated in (a) of FIG. 11.

The application running section 21 processes the first setting information thus received. Specifically, the application running section 21 specifies the account of the first user for the online storage service which the business operator operates with use of the server 20, and changes the first setting information as illustrated in (e) of FIG. 11 so that a process of displaying a list of the pieces of photograph data 175, which the first user stores in the folder 20a, is performed. The process is then performed based on the above changed first setting information, and the list of the pieces of photograph data 175 stored in the folder 20a specified is displayed. Specifically, the application running section 21 supplies screen definition information to the display control section 22 so that the list of the pieces of photograph data 175 will be displayed by a display section 18. In this case, the application running section 21 arranges the screen definition information with reference to antenna position information 32 such that each of respective display regions of the pieces of photograph data 175 includes a corresponding one of the antennas 150. Note that it is merely one example to arrange the screen definition information such that one antenna 150 is included in a display region of one piece of photograph data 175. It is also possible to arrange the screen definition information such that a plurality of antennas 150 is included in a display region of one piece of photograph data 175.

The display control section 22 controls the list of the pieces of photograph data 175 to be displayed as illustrated in (b) of FIG. 10. Specifically, the display control section 22 controls the display section 18 to display the pieces of photograph data 175, by performing a process in accordance with a script as illustrated in (d) of FIG. 11. Here, a piece at a leftmost position in a top row of the photograph data 175 in (b) of FIG. 10 is a piece of photograph data 175 which piece is indicated by "photo=1" in (d) of FIG. 11. Further, a piece of photograph data 175 indicated by "photo=2" is a piece of photograph data 175 which piece is displayed next to and on the right of the piece of photograph data 175 which piece is indicated by "photo=1". Similarly, a piece indicated by "photo=3" and subsequent pieces of photograph data 175 are displayed. Note that in (d) of FIG. 11, illustration of a piece indicated by "photo=4" and subsequent pieces of photograph data 175 is omitted.

Note that it is merely one example that the pieces of photograph data 175 are provided only on odd lines as illustrated in (b) of FIG. 10, and the pieces of photograph data 175 can be provided on even lines or any other positions. Further, the script illustrated in (d) of FIG. 11 is merely one example, and the screen definition information is not Limited to this example.

The application running section 21 also supplies the screen definition information to the region specifying section 23. With reference to the screen definition information, the region specifying section 23 specifies, as communication regions, the respective display regions of the pieces of photograph data 175. The region specifying section 23 then supplies, to the antenna control section 24, the antenna control information indicative of the communication regions thus specified.

The antenna control section 24 (i) controls, to be each in the communication state, antennas 150 which are included in the respective communication regions indicated by the antenna control information received, that is, in the respective display regions of the pieces of photograph data 175 as illustrated in (b) of FIG. 10 and (ii) controls, to be each in a non-communication state, the other antennas 150 which are not included in the communication regions.

Then, when the second user brings the smartphone 10B into proximity to any one of the antennas 150 which are included in the respective display regions of the pieces of photograph data 175 as illustrated in (c) of FIG. 10, the any one of the antennas 150 obtains second setting information from an NFC tag 110 of the smartphone 10B. Specifically, the any one of the antennas 150 obtains the second setting information as illustrated in (b) of FIG. 11, and supplies the second setting information thus obtained to the antenna control section 24 of the information processing device 1. The antenna control section 24 supplies, to the application running section 21, the second setting information together with position information of the any one of the antennas 150 via which any one the second setting information has been obtained. Note that the second setting information in Embodiment 3 is information indicative of an account of the second user for the online storage service which a business operator operates with use of the server 20. Specifically, in the second setting information, the account of the second use is indicated by "account=b". Note, however, that the second setting information is not limited to the above example illustrated in (b) of FIG. 11.

The application running section 21 processes the second setting information received. Specifically, the application running section 21 changes the second setting information received, in accordance with a piece of photograph data 175 which is displayed at a position indicated by the position information received. More specifically, the application running section 21 specifies the account of the second user for the online storage service which a business operator operates with use of the server 20, and changes the setting information as illustrated in (e) of FIG. 11 so that photograph data 175a indicated by "photo=13" will be copied in a folder 20b of the second user. Then, in accordance with the second setting information thus changed, the application running section 21 causes the server 20 to copy the photograph data 175a in the folder 20b.

As result, the photograph data 175a stored in the folder 20a is copied in the folder 20b. In other words, the second user can obtain the photograph data 175a of the first user.

Note that, though as described above, in Embodiment 3, the photograph data 175 is stored in the server 20 (specifically, in the folder 20a of the first user), an embodiment of the present invention is not limited this example. For example, an embodiment of the present invention can be configured such that the photograph data 175 is stored in the smartphone 10A and the photograph data 175 is supplied by near field communication to the information processing device 1 together with the setting information.

(Flow of Antenna Control Process)

Next, the flow of the antenna control process will be described below with reference to FIG. 12. FIG. 12 is a flowchart illustrating the flow of the antenna control process in accordance with Embodiment 3. In FIG. 12, the smartphone 10A is referred to as a first smartphone, and the smartphone 10B is referred to as a second smartphone. Note, however, that, hi the following description, the smartphone 10A will be referred to as a smartphone 10A as it is, and the smartphone 10B will be referred to as a smartphone 10B as it is.

First, the first user sets first setting information on the NFC tag 110 of his/her own smartphone 10A (S41). Specifically, in accordance with an instruction given by the application running section 130, the information setting section 120 sets, on the NFC tag 110, information indicative of an account of the first user for the online storage service which the business operator operates with use of the server 20 (see (a) of FIG. 11). This causes the NFC tag 110 to be in a state in which the NFC tag 110 is capable of transmitting the first setting information in a case where the NFC tag 110 is brought into proximity to an antenna 150 which is in the communication state (S42).

The second user also sets second setting information on the NFC tag 110 of his/her own smartphone 10B (S61). Specifically, in accordance with an instruction given by the application running section 130, the information setting section 120 sets, on the NFC tag 110, information indicative of an account of the second user for the online storage service which the business operator operates with use of the server 20 (see (b) of FIG. 11). This causes the NFC tag 110 to be in a state in which the NFC tag 110 is capable of transmitting the second setting information in a case where the NFC tag 110 is brought into proximity to an antenna 150 which is in the communication state (S62).

Meanwhile, the application running section 21 of the information processing device 1 instructs the antenna control section 24 to control all of the antennas 150 to be each in the communication state. In a case where (i) the NFC tag 110 of the smartphone 10A is brought into proximity to a an antenna 150 which is in the communication state (YES in S42) and (ii) the antenna 150 accordingly detects the NFC tag 110 (YES in S51), the NFC tag 110 transmits the first setting information to the information processing device 1 via the antenna 150 (S43). Specifically, in a case where the NFC communication section 15 obtains the first setting information via the antenna 150 which is in the communication state, the NFC communication section 15 transmits the first setting information to the antenna control section 24. In a case where the antenna control section 24 obtains the first setting information (S52), the antenna control section 24 supplies the first setting information thus received to the application running section 21.

In a case where the application running section 21 receives the first setting information, the application running section 21 causes each of photographs, stored in a folder 20a associated with the account indicated by the first setting information, to be displayed in alignment with a corresponding one of the antennas (S53). Specifically, the application running section 21 identifies the account of the first user for the online storage service which the business operator operates with use of the server 20, and changes the first setting information as illustrated in (c) of FIG. 11 so that a process of displaying a list of pieces of photograph data 175, which the first user stores in the folder 20a, is performed. As a result of performing the process which corresponds to the setting information thus changed, the application running section 21 then supplies, to the display control section 22, screen definition information, illustrated in (d) of FIG. 11, so that the list of the pieces of photograph data 175 is to be displayed. In so doing, the application running section 21 arranges, with reference to antenna position information 32, the screen definition information such that each of respective display regions of the pieces of photograph data 175 includes a corresponding one of the antennas 150. Note that the application running section 21 also supplies the screen definition information to the region specifying section 23. The display control section 22 then controls the list of the pieces of photograph data 175 to be displayed in accordance with the screen definition information thus received. As described above, the screen definition information is arranged such that each of the respective display regions of the pieces of photograph data 175 includes a corresponding one of the antennas 150. Therefore, each of the pieces of photograph data 175 is displayed in alignment with a corresponding one of the antennas 150.

Next, the region specifying section 23 specifies regions in which the respective photographs are displayed (S54). Specifically, in accordance with the screen definition information received, the region specifying section 23 specifies, as communication regions, the respective display regions of the pieces of photograph data 175. The region specifying section 23 then supplies, to the antenna control section 24, antenna control information indicative of the communication regions thus specified.

The antenna control section 24 specifies antennas which are included in the respective communication regions indicated by the antenna control information received, and controls (i) each of the antennas 150 thus specified to be in the communication state and (ii) each of the other antennas 150 to be in the non-communication state (S55).

In the NFC communication section 15 of the display device 11, the antennas 150 which are each in the communication state are each thus ready to detect the NFC tag 110 included in the smartphone FOB (S56). Here, in a case where (i) the NFC tag 110 of the smartphone 10B is brought into proximity to any one of the antennas 150 which are each in the communication state (YES in S62) and (ii) the any one of the antennas 150 accordingly detects the NFC tag 110 (YES in S56), the NFC tag 110 transmits the second setting information to the information processing device 1 via the any one of the antennas 150 (S63). Specifically, in a case where the NFC communication section 15 obtains the second setting information via any one of the antennas 150 which are each in the communication state, the NFC communication section 15 transmits the second setting information to the antenna control section 24. In a case where the antenna control section 24 obtains the second setting information (S57), the antenna control section 24 (i) supplies, to the application running section 21, the second setting information thus received, (ii) specifies a position of the any one of the antennas 150 via which any one the NFC communication section 15 has obtained the second setting information, and (iii) further supplies, to the application running section 21, position information indicative of the position thus specified.

In a case where the application running section 21 receives the second setting information and the position information, the application running section 21 causes the server 20 to copy, in a folder 20b associated with the account indicated by the second setting information, one of the pieces of photograph data 175 which one is displayed at the position of the any one of the antennas 150 which any one has detected the NFC tag 110 (S58). Specifically, the application running section 21 identifies, in accordance with the second setting information, the account of the second user for the online storage service which the business operator operates with use of the server 20. The application running section 21 further specifies one of the pieces of photograph data 175 which one is displayed at the position indicated by the position information received. The application running section 21 then changes the second setting information with use of a character string ("photo=13" illustrated in (e) of FIG. 11) indicative of such a specified one of the pieces of photograph data 175. The application running section 21 thus changes the second setting information as illustrated in (e) of FIG. 11, and causes the server 20 to copy, in the folder 20b, a piece of photograph data 175a (photograph data indicated by the "photo=13") which is stored in the folder 20a.

(Effects of Invention in Accordance with Embodiment 3)

As has been described, the information processing device 1 in accordance with Embodiment 3 specifies, as the communication regions, the respective display regions of the pieces of photograph data 175. This (i) causes, to be in the communication state, each of the antennas 150 which are included in the respective display regions of the pieces of photograph data 175 and (ii) causes each of the other antennas 150 to be in the non-communication state. In other words, since the other antennas 150 in respective regions in each of which a piece of photograph data 175 is not displayed are each in the non-communication state, it is possible to prevent communication which a user does not desire.

Note that the information, processing device 1 in accordance with Embodiment 3 does not transmit, to a smartphone 10, a response to setting information received from the smartphone 10. Therefore, near field communication performed in Embodiment 3 can be, for example, near field communication which is performed with use of (i) a smartphone including an RF tag and (ii) a display device including an RF tag reader.

Embodiment 4

Next, the following description will discuss Embodiment 4 with reference to FIG. 13 and FIG. 14. Note that, for convenience, members identical in function to the respective members described in Embodiments 1 through 3 will be given respective identical reference numerals, and descriptions of the members will be omitted.

In Embodiment 3, all of the antennas 150 which are included in the respective display regions of the pieces of photograph data 175 displayed by the display device 11 are each in the communication state. In Embodiment 4, described will be the following example: each of antennas 150 which are included in respective display regions of pieces of photograph data 175 is changed in state, depending on attribute information associated with a corresponding one of the pieces of photograph data 175.

(a) of FIG. 13 is a view illustrating an example of display of pieces of photograph data in Embodiment 4. (b) of FIG. 13 is a view illustrating a specific example of a script for the display of the pieces of photograph data illustrated in (a) of FIG. 13.

Each of the pieces of photograph data, stored in a server 20 (folder 20a), is associated with attribute information indicative of whether or not the each of the pieces of photograph data can be transferred to another user. In a case where an application running section 21 generates screen definition information in accordance with which a display section 18 is to display the pieces of photograph data stored in the folder 20*a*, the application running section 21 generates, with reference to the attribute information, an image display method including a character string indicative of whether or not another user can obtain the each of the pieces of photograph data. Specifically, a character string "access=" "" is used as illustrated in (b) of FIG. 13. Between the above double quotation marks, "true" or "false" is written. In a case where "true" is written, a piece of photograph data corresponding to such an image display method is a piece of photograph data 175 which another user can obtain. Meanwhile, in a case where "false" is written, a piece of photograph data corresponding to such an image display method is a piece of photograph data 176 which another user cannot obtain. Note that the script illustrated in (b) of FIG. 13 is a mere example, and the screen definition information is not limited to such an example.

The application running section 21 supplies, to a region specifying section 23, the screen definition information in which such information is written. With reference to the screen definition information, the region specifying section 23 specifies, as communication regions, respective display regions of pieces of photograph data 175 for each of which "true" is written. The region specifying section 23 then supplies, to an antenna control section 24, antenna control information indicative of the communication regions thus specified.

The antenna control section 24 controls, to be each in a communication state, merely antennas 150 which are included in the respective communication regions indicated by the antenna control information thus received, that is, the respective display regions of the pieces of photograph data 175, for each of which "true" is written. Meanwhile, the antenna control section 24 controls, to be each in a non-communication state, (i) antennas 150 which are included in respective display regions of pieces of photograph data 176, for each of which "false" is written and (ii) antennas 150 which are not included in the respective display regions of the pieces of photograph data 175 nor the respective display regions of the pieces of photograph data 176.

Note that, as the character string indicative of whether or not another user can obtain the each of the pieces of photograph data, the attribute information associated with the each of the pieces of photograph data can be used as it is. Alternatively, in accordance with the attribute information, the application running section 21 can write, in the screen definition information, the character string which is different from the attribute information.

Note also that the attribute information can specify a user to whom the each of the pieces of photograph data cannot be transferred. For example, a piece of photograph data can be associated with attribute information which indicates that the piece of photograph data cannot be transferred to a user other than a user who is set as a friend in an application or the like of online storage. Alternatively, a piece of photograph data can be associated with attribute information which indicates that the piece of photograph data cannot be transferred to a user at a given age, for example, a user under 18 years old. In such cases, when the application running section 21 obtains selling information of a smartphone 10B, the application running section 21 obtains, from the server 20, information indicative of a relationship between a first user and a second user or information indicative of an age of the second user. In a case where the application running section 21 obtains, for example, information indicating that the second user is under 18 years old, the region specifying section 23 obtains, from the application running section 21, (i) the information and (ii) the screen definition information including the attribute information which indicates that the piece of photograph data cannot be transferred to a user under 18 years old. The region specifying section 23 then specifies, as communication regions, respective image display regions of pieces of photograph data each of which is not associated with attribute information indicating that the each of the pieces of photograph data cannot be transferred to a user under 18 years old.

(Flow of Antenna Control Process)

Next, a flow of an antenna control process will be described below with reference to FIG. 14. FIG. 14 is a flowchart illustrating the flow of the antenna control process in accordance with Embodiment 4. Note that processes performed by respective smartphones 10A and 10B are similar to those illustrated in FIG. 12. Therefore, illustration of the processes will be omitted in FIG. 14, and also descriptions of the processes will be omitted below.

In Embodiment 4, unlike Embodiment 3, the region specifying section 23 specifies regions in which respective photographs, each associated with attribute information corresponding to access="true," are displayed (S74). The region specifying section 23 then supplies, to the antenna control section 24, antenna control information indicative of such communication regions thus specified.

Note that, since processes performed in steps S71 through S73 and S75 through S78 are similar to respective processes performed in the steps S51 through S53 and S55 through S58 illustrated in FIG. 12, the processes will not be described here.

(Effect of Invention in Accordance with Embodiment 4)

As has been described, an information processing device 1 in accordance with Embodiment 4 does not specify, as the communication regions, the respective display regions of the pieces of photograph data 176, each of which another user cannot obtain. Therefore, the antennas 150 which are included in the respective display regions of the pieces of photograph data 176 are each controlled to be in the non-communication state. Under the circumstances, even in a case where the second user accidentally brings the smartphone 10B into proximity to any one of the antennas 150 which are included in the respective display regions of the pieces of photograph data 176, near field communication is not performed. Accordingly, the second user cannot obtain one of the pieces of photograph data 176 which one corresponds to the any one of the antennas 150. As such, it is possible to prevent communication which a user does not desire.

Note that the information processing device 1 in accordance with Embodiment 4 does not transmit, to a smartphone 10, a response to setting information received from the smartphone 10. Therefore, near field communication performed in Embodiment 4 can be, for example, near field communication which is performed with use of (i) a smartphone including an RF tag and (ii) a display device including an RF tag reader.

Embodiment 5

Next, the following description will discuss Embodiment 5 with reference to FIG. 15 and FIG. 16. Note that, for convenience, members identical in function to the respective members described in Embodiments 1 through 4 will be given respective identical reference numerals, and descriptions of the members will be omitted.

In Embodiment 5 and Embodiment 6 (later described), described will be a configuration in which a communication region is specified in accordance with (i) a display region of an image displayed by a display section 18 and (ii) a region selected by a user conducting a touch operation.

FIG. 15 is a transition diagram illustrating an example of a flow of an antenna control process of Embodiment 5.

In Embodiment 5, unlike Embodiment 2, an application running section 21 supplies, to a display control section 22, screen definition information in accordance with which a content image 174 and a content image 177 (see (a) of FIG. 15) are to be displayed. The display control section 22 then controls the content image 174 and the content image 177 to be displayed as illustrated in (a) of FIG. 15.

The content image 177 is an image which encourages a user to conduct a touch operation in a display region of the content image 177 (see (a) of FIG. 15). In a case where the application running section 21 receives touch information indicative of a touch of an indicator with the display region of the content image 177, the application running section 21 supplies, to the display control section 22 and a region specifying section 23, screen definition information in accordance with which an content image 173 is to be displayed. The display control section 22 then controls the content image 173 to be displayed instead of the content image 177 (see (b) of FIG. 15).

In a case where the region specifying section 23 receives the screen definition information in accordance with which the content image 173 is displayed, the region specifying section 23 searches the screen definition information for data tags, and specifies, as a communication region, a display region of the content image 173 displayed in accordance with a character string including the data tags. The region specifying section 23 supplies, to an antenna control section 24, antenna control information indicative of the communication region thus specified.

The antenna control section 24 (i) controls, to be each in a communication state, antennas 150 which are included in the communication region indicated by the antenna control information received, that is, the display region of the content image 173 (see (b) of FIG. 15) and (ii) controls, to be each in a non-communication state, antennas 150 which are not included in the communication region.

Then, as illustrated in (c) of FIG. 15, in a case where a user brings a smartphone 10 into proximity to any one of the antennas 150 which are included in the display region of the content image 173, the any one of the antennas 150 obtains setting information from an NFC tag 110 of the smartphone 10.

(Flow of Antenna Control Process)

Next, a flow of the antenna control process will be described below with reference to FIG. 16. FIG. 16 is a flowchart illustrating the flow of the antenna control process in accordance with Embodiment 5. Note that a process performed by the smartphone 10 is similar to those illustrated in FIG. 6 and FIG. 9. Therefore, illustration of the process will be omitted in FIG. 16, and also description of the process will be omitted below.

The display control section 22 which has received screen definition information from the application running section 21 first controls a content image 174 and a content image 177 to be displayed in accordance with the screen definition information (S81). After the content image 174 and the content image 177 are displayed, the application running section 21 becomes ready to receive touch information (S82). Here, in a case where (i) an input section 17 detects a touch operation conducted with respect to a given content image (the content image 177 in Embodiment 5) (YES in S82) and (ii) the application running section 21 receives touch information, the application running section 21 supplies, to the display control section 22 and the region specifying section 23, screen definition information in accordance with which a content image 173 is to be displayed. The display control section 22, having received the screen definition information from the application running section 21, controls the content image 173, which includes data tags, to be displayed instead of the content image 177 in accordance with the screen definition information (S83).

Note that, since processes performed in steps S84 through S89 are similar to respective processes performed in the steps S22 through S27 illustrated in FIG. 9, the processes will not be described here.

(Effect of Invention in Accordance with Embodiment 5)

As has been described, an information processing device 1 in accordance with Embodiment 5 controls the content image 173, which includes the data tags, to be displayed in response to the touch operation conducted by the user with respect to the content image 177, and specifies, as the communication region, the display region of the content image 173. This causes a region which is displayed by the user's selection to be the communication region. Therefore, the user is capable of intuitively recognizing a region in which near field communication can be performed.

Embodiment 6

The following description will discuss Embodiment 6 with reference to FIG. 17 and FIG. 18. Note that, for convenience, members identical in function to the respective members described in Embodiments 1 through 4 will be given respective identical reference numerals, and descriptions, of the members will be omitted.

(a) through (c) of FIG. 17 are transition diagrams each illustrating an example of a flow of an antenna control process of Embodiment 6. (d) of FIG. 17 is a view illustrating another example of antenna control of Embodiment 6.

In Embodiment 6, unlike Embodiment 3, a region specifying section 23 does not specify a communication region at a time point at which the region specifying section 23 receives screen definition information in accordance with which pieces of photograph data 175 are displayed. That is, as illustrated in (a) of FIG. 17, all of antennas 150 are each in a non-communication state at a time point at which a display control section 22 controls a display section 18 to display the pieces of photograph data 175.

Here, an application running section 21 of Embodiment 6 holds pieces of touch, information in chronological order. The application running section 21 specifies a trail of touch operations inputted successively over a given time period. Specifically, the application running section 21 (i) specifies a trail of a drag operation by which a range is specified (see (b) of FIG. 17), (ii) generates selected region display information that is screen definition information in accordance with which display in a selected region B that is the range selected by the drag operation is caused to be different (for example, in color) from that in the other region, and (iii) supplies the selected region display information to the display control section 22 and the region specifying section 23. The display control section 22 causes the display in the selected region B to be different from that in the other region in accordance with the selected region display information received.

In a case where the region specifying section 23 receives the selected region display information, the region specifying section 23 specifies, as communication regions, respective display regions of pieces of photograph data 175 which are included in the selected region B, with reference to (i) screen definition information which the region specifying section 23 has already received and (ii) the selected region display information. The region specifying section 23 supplies, to an antenna control section 24, antenna control information indicative of the communication regions thus specified.

The antenna control section 24 (i) controls, to be each in a communication state, antennas 150 which are included the respective communication regions indicated by the antenna control information thus received, that is, the respective display regions of the pieces of photograph data 175 which are included in the selected region B (see (b) of FIG. 17) and (ii) controls, to be each in a non-communication state, the other antennas 150 which are not included in the display regions.

Then, in a case where a user brings a smartphone 10 into proximity to any one of the antennas 150 which are included in the respective display regions of the pieces of photograph data 175 which are included in the selected region B (see (c) of FIG. 17), the any one of the antennas 150 obtains setting information from an NFC tag 110 of the smartphone 10.

Note that the region specifying section 23 can specify the selected region B as a communication region. In this case, the antenna control section 24 controls, to be each in the communication state, antennas 150 which are included in the selected region B (see (d) of FIG. 17).

(Flow of Antenna Control Process)

Next, the flow of the antenna control process will be described below with reference to FIG. 18. FIG. 18 is a flowchart illustrating the flow of the antenna control process in accordance with Embodiment 6. Note that processes performed by respective smartphones 10A and 10B are similar to those illustrated in FIG. 12. Therefore, illustration of the processes will be omitted in FIG. 18, and also descriptions of the processes will be omitted below.

In Embodiment 6, unlike Embodiment 3, after a list of pieces of photograph data 175 is displayed, the application running section 21 becomes ready to receive pieces of touch information (S94). In a case where (i) the input section 17 detects touch operations (drag operation) by which a range including ones of such pieces of displayed photograph data 175 is selected (YES in S94) and (ii) the application running section 21 receives pieces of touch information, the application running section 21 generates selected region display information that is screen definition information in accordance with which display in a selected region B that is the range selected is caused to be different from that in the other region, and supplies the selected region display information to the display control section 22 and the region specifying section 23. The display control section 22 then controls the display in the selected region B to be different from that in the other region in accordance with the selected region display information thus received.

Subsequently, the region specifying section 23 specifies, in the range selected, regions in which respective photographs are displayed (S95). Specifically, in a case where the region specifying section 23 receives the selected region display information, the region specifying section 23 specifies, as communication regions, respective display regions of pieces of photograph data 175 which are included in the selected region B, with reference to (i) screen definition information which the region specifying section 23 has already received and (ii) the selected region display information. The region specifying section 23 then supplies, to the antenna control section 24, antenna control information indicative of the communication regions thus specified.

Note, since that processes performed in steps S91 through 93 and S96 through S99 are similar to respective processes performed in the steps S51 through S53 and S55 through S58 illustrated in FIG. 12, the processes will not be described here.

(Effect of Invention in Accordance with Embodiment 6)

As has been described an information processing device 1 in accordance with Embodiment 6 specifies, as the communication regions, the respective display regions of the pieces of photograph data 175 which are included in the selected region B. Here, it is considered that the selected region B is a region selected by a second user and that the pieces of photograph data 175 which are included in the selected region B are pieces of photograph data 175 which the second user desires to obtain. That is, it is possible, to control, to be each in the communication state, merely antennas 150 which are included in the respective display regions of the pieces of photograph data 175 that the second user desires to obtain. This causes near field communication not to be performed even in a case where the second user accidentally brings a smartphone 10B into proximity to any other antenna 150, and accordingly causes the second user not to obtain a piece of photograph data 175 which the second user does not desire. Therefore, it is possible to prevent communication which a user does not desire.

Note that the information processing device 1 in accordance with Embodiment 6 does not transmit, to the smartphone 10, a response to setting information received from the smartphone 10. Therefore, near field communication performed in Embodiment 6 can be near field communication which is performed with use of (i) a smartphone including an RF tag and (ii) a display device including an RF tag reader.

Embodiment 7

Next, the following description will further discuss Embodiment 7 of the present invention with reference to FIG. 19 and FIG. 20. Note that, for convenience, members identical in function to the respective members described in Embodiments 1 through 3 will be given respective identical reference numerals, and descriptions of the members will be omitted.

In Embodiments 1 and 2, the setting information is transmitted from the smartphone 10 to the display device 11 and the information processing device 1 by near field communication, and the setting information which has been changed by the information processing device 1 is transmitted to the smartphone 10 by near field communication. That is, the NFC tag 110 of the smartphone 10 and the NFC communication section 15 (specifically, any one of the antennas 150) of the display device 11 are configured to perform two-way near field communication with each other.

In contrast, in Embodiment 7, described will be a configuration in which an NFC tag 110 performs one-way near field communication with an NFC communication section 15, that is, one-way near field communication is performed from the NFC tag 110 to the NFC communication section 15. Note that Embodiment 7 will describe an example in which Embodiment 1 is altered such that one-way near field communication is performed, and Embodiment 8 (later described) will describe an example in which Embodiment 2 is altered such that one-way near field communication is performed.

(Near Filed Communication System 200)

First, a near filed communication system 200 will be described below with reference to FIG. 19. FIG. 19 is a view schematically illustrating an example of the near filed communication system 200.

As illustrated in FIG. 19, the near filed communication system 200 includes an information processing device 1, a smartphone 10, a display device 11, an NFC management server 210, and a content management server 220. Note that, since the information processing device 1, the smartphone 10, and the display device 11 have been already described in Embodiment 1, the information processing device 1, the smartphone 10, and the display device 11 will not be described below.

The NFC management server 210 manages various pieces of information each related to near field communication. Specifically, the NFC management server 210 manages, in association with each other, (i) information (hereinafter, referred to as a user account) which Identifies a user of a device (the smartphone 10 in Embodiment 7) including an NFC tag and (ii) tag identification information which identifies the device (the smartphone 10) including the NFC tag.

The NFC management server 210 obtains the tag identification information together with an instruction to supply setting information to the smartphone 10 which instruction is given by the smartphone 10. The NFC management server 210 specifies the user account in accordance with the tag identification information thus obtained. The NFC management server 210 venerates setting information with use of the user account thus specified, and transmits the setting information to the smartphone 10.

Here, in Embodiment 7, the setting information is a character string indicative of the user account which is managed by the NFC management server 210. Note that the setting information is not Limited to such an example. For example, the setting information can be alternatively a character string indicative of a folder path or a URL of a folder associated with the user account by NFC management server 210. Alternatively, the setting information can be a character string (a folder path, a URL, or the like) indicative of a given region (folder) of a storage section 140 of the smartphone 10.

The NFC management server 210 also performs a process in accordance with the setting information which has been changed and supplied from the information processing device 1. The setting information which has been changed is information that is obtained by adding, to the setting information which has not been changed, a character string indicative of (i) specifying various pieces of information which are managed by the content management server 220 (later described) and (ii) specifying processes performed with respect to the respective various pieces of information thus specified. The NFC management server 210 specifies, in accordance with the setting information which has been changed and supplied from the information processing device 1, (i) information (hereinafter, referred to as a content) which is managed by the content management server 220 and (ii) a process which should be performed with respect to the content. The NFC management server 210 then performs the process with respect to the content. For example, the NFC management server 210 associates the user account with an URL of a Web page which URL is added to the setting information that has been changed. This makes it possible to cause the smartphone 10 to display the Web page, by accessing the NFC management server 210 with use of the smartphone 10. Note that specific examples of (i) the content which the NFC management server 210 specifies and (ii) the process which the NFC management server 210 performs with respect to the content are not limited the above examples.

The NFC management server 210 then notifies the smartphone 10 that the NFC management server 210 has performed the process with respect to the above content information.

The content management server 220 manages various pieces of information related to applications run by the information processing device 1. The content management server 220 transmits the various pieces of information to the information processing device 1 via an Inter net network 30. For example, the content management server 220 can hold and operate a Web site. The information processing device 1 can control the display device 11 to display the Web site, by running an application for browse of the Web site.

Note that a single server can have both of the foregoing function of the NFC management server 210 and the foregoing function of the content management server 220.

(Flow of Processes Performed by Near Filed Communication System 200)

Here, a flow of processes performed by respective devices included in the near filed communication system 200 will be described below, in detail, with reference FIG. 19. Further, pieces of information transmitted between the devices will be described below, in detail, with reference FIG. 19. Note that FIG. 19 illustrates the processes which are performed after the smartphone 10 receives setting information from the NFC management server 210 and the setting information is set on an NFC tag 110.

First, the setting information is transmitted from the smartphone 10 to the display device 11 by near field communication (NFC). Specifically, in a case where a user brings the smartphone 10 into proximity to the display device 11, near field communication is performed between the NFC tag 110 and an NFC communication section 15 (specifically, any one of antennas 150) included in the display device 11). This causes the setting information to be transmitted from the smartphone 10 to the display device 11. The display device 11 supplies, to the information processing device 1, the setting information thus received.

The information processing device 1 changes the setting information thus received in accordance with a position of the any one of the antennas 150 which any one has detected the NFC tag 110. The information processing device 1 then transmits, to the NFC management server 210, the setting information which has been changed.

The NFC management server 210 associates a content with a user account in accordance with the setting information which has been changed, in Embodiment 7, the NFC management server 210 associates, with the user account, a Web site (for example, a Web page of an art museum) which the content management server 220 manages. The NFC management server 210 then notifies the smartphone 10 that such association has been completed.

Thereafter, the smartphone 10 informs the user that the smartphone 10 has received the above notification. How to inform the user is not limited in particular. For example, the smartphone 10 can display, on a display section (not illustrated), an image or a character string each of which indicates that the smartphone 10 has received the notification. Alternatively, the smartphone 10 can output, from a sound outputting section (not illustrated), a sound which indicates that the smartphone 10 has received the notification.

The user accesses the NFC management server 210 by operating an input section (not illustrated) included in the smartphone 10. In so doing, the user inputs the user account in the input section by operating the input section. Since the user account is associated with the content by the NFC management server 210, the user is capable of browsing, on the smartphone 10, the content (for example, the Web page of the art museum) by accessing the NFC management server 210 with use of the smartphone 10.

(Flow of Antenna Control Process)

Next, a flow of an antenna control process will be described below with reference to FIG. 20. FIG. 20 is a flowchart illustrating the flow of the antenna control process in accordance with Embodiment 7. Note that, in FIG. 20, the display device 11 displays a first level 170.

First, a user sets setting information on the NFC tag 110 of his/her own smartphone 10. Specifically, an application running section 130 included in the smartphone 10 (i) instructs the NFC management server 210 to supply, to the smartphone 10, the setting information and (ii) transmits tag identification information to the NFC management server 210. In a case where the NFC management server 210 receives such an instruction and the tag identification information, the NFC management server 210 specifies a user account associated with the tag identification information thus received, and generates setting information which is a character string indicative of the user account. The NFC management server 210 transmits the setting information thus generated to the smartphone 10 (S121).

In a case where the smartphone 10 receives the setting information from the NFC management server 210 (S11), the smartphone 10 sets the setting information on the NFC tag 150 (S112). Since the step S112 is similar to the step S11 described in Embodiment 1, detailed description of the step S112 will be omitted below.

Furthermore, since processes performed in steps S101 through S107, S113, and S114 are similar to respective processes performed in the steps S1 through S7, S12, and S13 described in Embodiment 1, the processes will not be described here.

Next, an application running section 21 included in the information processing device 1 transmits, to the NFC management server 210, the setting information which has been changed (S108).

In a case where the NFC management server 210 receives the setting information which has been changed (S122), the NFC management server 210 associates, in accordance with the setting information which has been changed, the user account with an URL indicated by the setting information (S123). Specifically, the NFC management server 210 associates the user account with an URL of a Web page of an art museum which URL is included in the setting information that has been changed. Note that the Web page is managed by the content management server 220. The NFC management server 210 then notifies the smartphone 10 that the NFC management server 210 has associated the user account with the URL (S124).

Finally, a communication section (not illustrated) included in the smartphone 10 receives a notification from the NFC management server 210 (S115). The antenna control process in accordance with Embodiment 7 thus ends. Note that, since processes performed after the communication section of the smartphone 10 receives the notification are similar to those described above, the processes will not be described here.

Embodiment 8

Next, the following description will further discuss Embodiment 8 of the present invention with reference to FIG. 19 and FIG. 21. Note that, for convenience, members identical in function to the respective members described in Embodiments 1 through 3 will be given respective identical reference numerals, and descriptions of the members will be omitted.

Embodiment 8 will describe an example in which Embodiment 2 is altered such that one-way near field communication is performed. That is, in Embodiment 8, as with the case of the server 20 in Embodiment 2, a content management server 220 manages a piece of photograph data. Therefore, setting information which has been changed is a character string indicative of (i) specifying the piece of photograph data managed by the content management server 220 and that (ii) associating the piece of photograph data thus specified with a user account.

(Flow of Antenna Control Process)

Next, a flow of an antenna control process will be described below with reference to FIG. 21. FIG. 21 is a flowchart illustrating the flow of the antenna control process in accordance with Embodiment 8. Note that, since (i) processes performed in steps S131 through S136 are similar to respective processes performed in the steps S21 through S26 described in Embodiment 2, (ii) a process performed in step S137 is similar to a process performed in the step S108 described in Embodiment 7, (iii) processes performed in steps S141 through S145 and S151 are similar to respective processes performed in the steps S111 through S115 and S131 described in Embodiment 7, those processes will not be described below.

In a case where an NFC management server 210 receives setting information which has been changed (S152), the NFC management server 210 associates, in accordance with the setting information which has been changed, a user account with a piece of photograph data indicated by the setting information (S153). Specifically, the NFC management server 210 associates the user account with the piece of photograph data managed by the content management server 220. The NFC management server 210 then notifies a smartphone 10 that the NFC management server 210 has associated the user account with the piece of photograph data (S154).

This allows a user to browse, on the smartphone 10, the piece of photograph data by accessing the NFC management server 210 with use of the smartphone 10. Note that the smartphone 10 can be arranged so as to download the piece of photograph data to the smartphone 10 by accessing the NFC management server 210.

Note also that the setting information which has been changed can indicate a process of downloading the piece of photograph data to the smartphone 10, instead of indicating a process of associating the user account with the piece of photograph data. Specifically, the NFC management server 210 specifies tag identification information in accordance with the user account included in the setting information which has been changed. The NFC management server 210 then obtains the piece of photograph data from the content management server 220, and transmits the piece of photograph data to the smartphone 10 indicated by the tag identification information.

[Variations]

The following description will discuss variations of Embodiments 1 through 8.

FIG. 22 is a view illustrating another example of antenna control of a variation of Embodiment 2. In FIG. 22, antennas 150 each of which is drawn together with a single oblique line are antennas 150 to each of which supply of electric power is stopped. As illustrated in FIG. 22, no electric power can be supplied to antennas 150 each of which is in a non-communication state. This causes electric power to be supplied to merely antennas 150 each of which is in a communication state. Therefore, it is possible to suppress electric power consumed by a display device 11. Note that FIG. 22 illustrates a variation of Embodiment 2, but this variation is applicable to another embodiment.

Furthermore, the antennas 150 each of which is in the communication state can be displayed so that respective positions of the antennas 150 each of which is in the communication state are distinguished from respective positions of the antennas 150 each of which is in the non-communication state. For example, regions corresponding to the respective positions of the antennas 150 each of which is in the communication state can be each lighted in a given color in a shape of a corresponding one of the antennas 150. With, this, regions corresponding to the respective positions of the antennas 150 each of which is in the non-communication state are each not lighted. Therefore, in a case where, for example, an antenna 150 which should be in the communication state is in the non-communication state due to a breakdown, a user is capable of recognizing that the antenna 150 is in the non-communication state. This causes the user not to bring a smartphone 10 into proximity to the antenna 150 via which information cannot be transmitted and received by near field communication.

Moreover, a region specifying section 23 can be arranged so as to (a) obtain, from a member (not illustrated) which controls an OS (operating system), information indicative of (i) a region, of an image which is being selected by an operation conducted by a user or (ii) a region of an image via which an operation to be conducted by the user is ready to be accepted and (b) specify such a region as a communication region. This makers it possible to specify the image which is being selected by the operation conducted by the user or the image via which an operation to be conducted by the user is ready to be accepted, even in a case where screen definition information is not arranged such that the image which is being selected or the image via which an operation to be conducted by the user is ready to be accepted is displayed so as to be different from another image.

Further, in each of Embodiments 1 through 8, the region specifying section 23 specifies, with reference to screen definition information, a display region of an image, such as an item of a menu image, a content image, or a piece of photograph data, as a communication region. Alternatively, the region specifying section 23 can be arranged so as to specify, with reference to the screen definition information, a region, other than the display region of the foregoing image, as the communication region.

For example, it is assumed that the screen definition information includes information in accordance with which an image of a character string "please bring your smartphone closer to the screen" (hereinafter, referred to as a character string image). In this ease, the region specifying section 23 specifies, as the communication region, a region other than a display region of the character string image on a display section 18, with reference to the screen definition information. This (i) causes, to be each in the communication state, antennas 150 which are included in the region other than the display region of the character string image on the display section 18 and (ii) causes, to be each in the non-communication state, antennas 150 which are included in the display region of the character string image.

Further, in each of Embodiments 1 through 8, a display region of an image is specified as a communication region. Note, however, that, in a case where a single image corresponds to an antenna(s) 150, the communication region can be specified so as to include an antenna 150 which is not included in a display region of the single image, provided that the display region of the single image and the antenna(s) 150 are in 1:1 correspondence or 1:N (N is an integer of 1 or more) correspondence.

Specifically, an NFC tag 110 measures radio field intensity of each of antennas 150, and performs near field communication with an antenna 150 which has the highest radio field intensity. That is, in a case where (i) an image is displayed so that a display region of the image is closest to an antenna 150 and (ii) merely the image is specified at a position at which the image is displayed, a process corresponding to the image is performed when the antenna 150 and the NFC tag 110 perform near field communication with each other.

This variation will be described, in more detail, with reference to FIG. 3. It can be expressed that an antenna 150 located on a right side of the item 172 illustrated in (b) of FIG. 3 is an antenna 150 which is closest to the item 172 out of a plurality of items displayed on the display device 11 (display section 18). That is, in a case where the antenna 150 is controlled to be in the communication state, an image corresponding to the antenna 150 is the item 172.

In such a case, the region specifying section 23 expands the communication region so that the communication region includes, in addition to a region of the item 172, a region including the antenna 150 located on the right side of the item 172. With this arrangement, an antenna 150 which is controlled to be in the communication state does not need to be included in a display region of an image. This causes an increase in degree of freedom of a positional relationship between the antenna 150 and the display region of the image. It is therefore possible to naturally arrange the image.

Embodiment 9

Each of Embodiments 1 through 8 has described an example in which a single information processing device 1 is used. Alternatively, functions of an information processing device 1 can be realized by respective separate devices. For example, the information processing device 1 can be made up of (i) an application running device which runs an application and which causes a display device 11 to display a screen serving as a result of running of the application and (ii) an antenna control device which controls a state of each of antennas depending on a display region of an image included in the screen.

Embodiment 10

Each block of an information processing device 1 and a smartphone 10 can be realized by a logic circuit (hardware) provided in an integrated circuit (IC chip) or the like or can be alternatively realized by software as executed by a central processing unit (CPU). In the latter case, each of the information processing device 1 and the smartphone 10 can be configured with use of a computer (electronic calculator) as illustrated in FIG. 23.

FIG. 23 is a block diagram illustrating an example of a configuration of a computer 910 which is usable as each of the information processing device 1 and the smartphone 10. The computer 910 includes an arithmetic logic unit 912, a main storage 913, an auxiliary storage 914, an input-output interface 915, and a communication interface 916 which are connected to each other via a bus 911. Each of the arithmetic logic unit 912, the main storage 913, and the auxiliary storage 914 can be a CPU, an RAM (random access memory), or a hard disk drive. The input-output interface 915 is connected with (i) an input device 920 via which a user (contractor) inputs various pieces of information in the computer 910 and (ii) an output device 930 via which the computer 910 outputs various pieces of information to the user. Each of the input device 920 and the output device 930 can be embedded in the computer 910 or can be alternatively connected to the computer 910 (externally connected to the computer 910). For example, the input device 920 can be a keyboard, a mouse, a touch sensor, or the like, and the output device 930 can be a display, a printer, a speaker, or the like. Alternatively, a device having both of a function of the input device 920 and a function of the output device 930 (such as a touch panel into which a touch sensor and a display are integrated) can be employed. The communication interface 916 is an interface via which the computer 910 communicates with an external device. Note that the communication interface 916 includes a communication interface via which near field communication is performed.

In the auxiliary storage 914, various programs are stored each of which causes the computer 910 to operate as each of the information processing device 1 and the smartphone 10. The arithmetic logic unit 912 loads, in the main storage 913, the various programs stored in the auxiliary storage 914, and executes a command included in each of the various programs so that the computer 910 functions as each section of the information processing device 1 and the smartphone 10. Note that a recording medium which the auxiliary storage 914 uses to record information, such as the various programs, only needs to be a computer-readable "non-transitory tangible medium." Examples of the recording medium include tapes, disks, cards, semiconductor memories, and programmable logic circuits.

The various programs can be obtained from outside of the computer 910. In this case, the various programs can be obtained via any transmission medium (such as a communication network or a broadcast wave). The present invention can also be achieved in the form of a computer data signal in which the various programs are embodied via electronic transmission and which is embedded in a carrier wave.

[Summary]

An information processing device (1) in accordance with a first aspect of the present invention is an information processing device which controls each of a plurality of antennas (150) of a display device (11) to be in a communication state or in a non-communication state, the communication slate being a stale in which the each of the plurality of antennas allows external near field communication to be performed via the each of the plurality of antennas, the non-communication state being a state in which the each of the plurality of antennas allows the external near field communication not to be performed via the each of the plurality of antennas, the display device including a display section (18) and a near field communication, section (NFC communication section 15) which is provided on the display section so as to be stacked on the display section and which includes the plurality of antennas via each of which the external near field communication is performed, the information processing device including: a region determining section (region specifying section 23) which determines a given region of a display region of the display section in accordance with a region of an element image included in a screen displayed on the display section; and an antenna control section (24) which (i) controls, to be in the communication state, at least one of the plurality of antennas which at least one is included in the given region and (ii) controls another one or more of the plurality of antennas to be in the non-communication state.

According to the above configuration, in accordance with an element image included in a screen displayed on the display section, an antenna which is included in a given region of the display region of the display section is controlled to be in a communication state, and the other antennas are each controlled to be in a non-communication state.

This allows (i) near field communication to be performed merely via the antenna, which is included in the given region corresponding to a region of the element image included in the screen displayed on the display section of the display device, and (ii) near field communication not to be performed via the other antennas. Therefore, it is possible to prevent communication which a user does not desire.

Note that the element image includes one or more images included in the screen, and includes, in addition to an image which is presented as an image to the user, an image which is presented as a character string to the user. Examples of the image which is presented as an image include a piece of photograph data. Examples of the image which is presented as a character string include a file name of the piece of photograph data.

The information processing device in accordance with a second aspect of the present invention can be arranged such that, in the first aspect, the region determining section determines, as the given region, a region in which a given image included in the element image is displayed.

The above configuration allows near field, communication to be performed merely via an antenna that is included in a region in which a given image included in an element image is displayed. It is therefore possible to prevent communication which a user does not desire. Furthermore, the given image is displayed in the region in which the near field communication can be performed. It is therefore possible to inform the user of the region in which the near field communication can be performed.

The information processing device in accordance with a third aspect of the present invention can be arranged such that, in the first or second aspect, the region determining section determines, as the given region, a region in which the element image that is associated with state specifying information is displayed, the state specifying information indicating that the external near field communication is performed via the at least one of the plurality of antennas.

According to the above configuration, it is possible to determine, as the given region, a region in which an image, included in an element image and associated with state specifying information, is displayed. That is, an antenna that is included in a region in which an element image, being not associated with the state specifying information, is displayed is controlled to be in the non-communication state. It is therefore possible to control, to be in the communication state, merely an antenna which needs to be in the communication state.

The information processing device in accordance with a fourth aspect of the present invention can be arranged such that, in any one of the first through third aspects, the region determining section determines, as the given region, a region in which the element image that is selected by an input operation conducted by a user is displayed.

According to the above configuration, a region of an element image which is included in a displayed element image and which is selected by an input operation conducted by a user is determined as the given region. In other words, even in a case where an element image is displayed, a region of the element image is not determined as the given region when the element image is not selected by an input operation conducted by a user. Accordingly, an antenna which is included in a display region of such an element image is controlled to be in the non-communication state. It is therefore possible to minimize the number of antennas which need to be in the communication state.

For the user, an antenna which is included in the region of the element image that is selected by the input operation conducted by the user is controlled to be in the communication state. Therefore, the user is capable of easily recognizing the region which includes the antenna that is in the communication state.

The information processing device in accordance with a fifth aspect of the present invention can be arranged such that, in any one of the first through fourth aspects, the region determining section determines, as the given region, a region which includes the element image and which is selected by an input operation conducted by a user.

According to the above configuration, a region which is selected by an input operation conducted by a user is determined as the given region. That is, (i) an antenna which is included in the region that is selected by the input operation conducted by the user and which is included in a region in which an element image is displayed and (ii) an antenna which is arranged in a vicinity of the element image are each controlled to be in the communication state.

According to this arrangement, in a case where (i) the user causes near field communication to be performed and (ii) an antenna is slightly apart from the region in which the element image is displayed, it is possible to cause the near field communication to be performed via the antenna, provided that the antenna is included in the region which is selected by the input operation conducted by the user. It is therefore possible to realize transmission, and reception of information which transmission and reception is performed by near field communication and which transmission and reception is highly convenient for the user.

The information processing device in accordance with a sixth aspect of the present invention can be arranged such that. In any one of the first through fifth aspects, the display section is a touch panel (16) which is capable of accepting an input operation conducted by a user; and the region determining section determines, as the given region, a region in which the element image via which the touch panel accepts the input operation is displayed.

According to the above configuration, an antenna that is included in a region in which an element image, via which the touch panel accepts an input operation (touch operation), is displayed is controlled to be in the communication state.

The element image, via which the touch panel accepts a touch operation conducted by a user with respect to the touch panel, thus becomes an element image which causes near field communication to be performed in a case where a terminal device or the like is brought into proximity to the element image. Therefore, it is possible to (i) realize a user-friendly interface and accordingly (ii) prevent the user from making unnecessary movement, e.g., bringing a terminal device into proximity to a different antenna.

The information processing device in accordance with a seventh aspect of the present invention can be arranged so as to, in any one of the first through sixth aspects, further including: a process performing section (application running section 21) which performs, depending on a terminal device (smartphone 10) that is brought into proximity to one of the plurality of antennas which one is in the communication state, a process that is associated with the element image displayed in a region including the one of the plurality of antennas.

According to the above configuration, it is possible to perform, depending on a terminal device that is brought into proximity to an antenna which is in the communication state, a process associated with an element image to which the terminal device is brought into proximity. This makes it possible to, for example, bring about, merely to a user who has caused near field communication to be performed, an effect resulting from the process. Specifically, it is possible to copy a piece of photograph data, owned by another user, in a folder of an online storage service which folder is owned by a user who has caused near field communication to be performed.

The information processing device in accordance with an eighth aspect of the present invention can be arranged such that, in the seventh aspect, as the process that is associated with the element image, the process performing section transmits information, associated with the element image, to the terminal device via the one of the plurality of antennas to which one the terminal device is brought into proximity.

According to the above configuration, information is transmitted, via an antenna which is in the communication state, to a terminal device which is brought into proximity to the antenna. Therefore, a user is capable of obtaining a result of a process on the terminal device which is brought into proximity to the antenna.

For example, it is possible to (i) move or copy, into a terminal device, a piece of photograph data stored in a server of an online storage service or (ii) browse, on the terminal device, contents of a Web page which contents come subsequent to a content, having been displayed on the display device.

The information processing device in accordance with a ninth aspect of the present invention can be arranged such that, in any one of the first through eighth aspects, the antenna control, section controls the another one or more of the plurality of antennas to be in the non-communication state, by stopping supply of electric power to the another one or more of the plurality of antennas.

According to the above configuration, in a case where an antenna is controlled to be in the non-communication state, supply of electric power to the antenna is stopped.

This causes electric power to be supplied merely to an antenna which is in the communication state. It is therefore possible to suppress electric power consumed by the antenna.

A display device in accordance with a tenth aspect of the present invention is a display device including: a display section; and a near field communication section which is provided on the display section so as to be stacked on the display section and which includes a plurality of antennas via each of which external near field communication is performed, the near field communication section controlling, in accordance with a region of an element image included in a screen displayed on the display section, each of the plurality of antennas to be in a communication state or in a non-communication state, the communication state being a state in which the each of the plurality of antennas allows the external near field communication to be performed via the each of the plurality of antennas, the non-communication state being a state in which the each of the plurality of antennas allows the external near field communication not to be performed via the each of the plurality of antennas.

According to the above configuration, out of a plurality of antennas, merely an antenna which is included in a given region corresponding to a region of an element image included in a screen displayed on the display section is controlled to be in the communication state.

This allows (i) near field communication to be performed merely via the antenna which is included in the given region corresponding to the element image displayed on the display section and (ii) near field communication not to be performed via the other antennas. Therefore, it is possible to prevent communication which a user does not desire.

A terminal device in accordance with an eleventh aspect of the present invention is a terminal device including: a transmitting section which transmits given information to a display device, the display device including a display section and a near field communication section which is provided on the display section so as to be stacked on the display section and which includes a plurality of antennas via each of which external near field communication is performed, each of the plurality of antennas being in a communication state or in a non-communication state, the communication state being a state in which the each of the plurality of antennas allows the external near field communication to be performed via the each of the plurality of antennas, the non-communication state being a state in which the each of the plurality of antennas allows the external near field communication not to be performed via the each of the plurality of antennas, the transmitting section transmitting the given information to the display device via one of the plurality of antennas which one is in the communication state, by being brought into proximity to the one of the plurality of antennas, the terminal device causing, by transmission of the given information, a process to be performed, the process being associated with an element image included in a screen displayed in a region of the display section which region includes the one of the plurality of antenna which one is used for the transmission of the given, information.

According to the above configuration, it is possible to cause a process associated with an element image to be performed in accordance with given information transmitted from the terminal device. This makes it possible to, for example, bring about, merely to a user who has caused near field communication to be performed, an effect resulting from the process. Specifically, it is possible to (i) copy a piece of photograph data, owned by another user, in a folder of an online storage service which folder is owned by a user who has caused near field communication to be performed, (ii) move or copy, into the terminal device, a piece of photograph data stored in a server of an online storage service, or (ii) browse, on the terminal device, contents of a Web page which contents come subsequent to a content having been displayed on a display device.

A near filed communication system 100 in accordance with a twelfth aspect of the present invention is a near filed communication system including: a display device which includes a display section and a near field communication section that is provided on the display section so as to be stacked on the display section and that includes a plurality of antennas via each of which external near field communication is performed; and an information processing device which controls each of the plurality of antennas of the display device to be in a communication state or in a non-communication state, the communication state being a state in which the each of the plurality of antennas allows the external near field communication to be performed via the each of the plurality of antennas, the non-communication state being a state in which the each of the plurality of antennas allows the external near field communication not to be performed via the each of the plurality of antennas, the information processing device (i) controlling, to be in the communication state, at least one of the plurality of antennas which at least one is included in a given region of a display region of the display section and (ii) controlling another one or more of the plurality of antennas to be in the non-communication state, the given region being determined in accordance with a region of an element image included in a screen displayed on the display section.

According to this near filed communication system, it is possible to bring about effects similar to those brought about by the information processing device in accordance with the first aspect.

A method of controlling an information processing device in accordance with a thirteenth aspect of the present invention is a method of controlling an information processing device which controls each of a plurality of antennas of a display device to be in a communication state or in a non-communication state, the communication state being a state in which the each of the plurality of antennas allows external near field communication to be performed via the each of the plurality of antennas, the non-communication state being a state in which the each of the plurality of antennas allows the external near field communication not to be performed via the each of the plurality of antennas, the display device including a display section and a near field communication section which is provided on the display section so as to be stacked on the display section and which includes the plurality of antennas via each of which the external near field communication is performed, the method including: a region determining step (S3) of determining a given region of a display region of the display section, the given region corresponding to a region of an element image included in a screen displayed on the display section; and an antenna controlling step (S4) of (i) controlling, to be in the communication state, at least one of the plurality of antennas which at least one is included in the given region and (ii) controlling another one or more of the plurality of antennas to be in the non-communication state.

According to this method, it is possible to bring about effects similar to those brought about by the information processing device in accordance with the first aspect.

The information processing device, the display device, and the terminal device in accordance with the foregoing aspects of the present invention can be realized by a computer. In this case, the present invention encompasses; a control program which causes a computer to realize the information processing device, the display device, and the terminal device, the control program causing the computer to operate as each section (limited to software elements) of the information processing device, the display device, and the terminal device; and a computer-readable recording medium in which the control program is recorded.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to an information processing device and the like each of which controls a state of each of antennas via each of which near field communication is performed.

REFERENCE SIGNS LIST

1 Information processing device
10 Smartphone (terminal device)
11 Display device
15 NFC communication section (near field communication section)
16 Touch panel
18 Display section
21 Application running section (process performing section)
23 Region specifying section (region determining section)
24 Antenna control section
100 Near filed communication system
110 NFC tag (transmitting section)
150 Antenna
200 Near filed communication system
S3 Region determining step
S4 Antenna controlling step

The invention claimed is:

1. An information processing device which, controls each of a plurality of antennas of a display device to be in a communication state or in a non-communication state, the communication state being a state in which the each of the plurality of antennas allows external near field communication to be performed via the each of the plurality of antennas, the non-communication state being a state in which the each of the plurality of antennas allows the external near field communication not to be performed via the each of the plurality of antennas, the display device including a display section and a near field communication section which is provided on the display section so as to be stacked on the display section and which includes the plurality of antennas via each of which the external near field communication is performed, the information processing device comprising:
a region determining section which determines a given region of a display region of the display section in accordance with a region of an element image included in a screen displayed on the display section; and
an antenna control section which (i) controls, to be in the communication state, at least, one of the plurality of antennas which at least one is included in the given region and (ii) controls another one or more of the plurality of antennas to be in the non-communication state, wherein
the display section is a touch panel which is capable of accepting an input operation conducted by a user; and
the region determining section determines, as the given region, a region in which the element image via which the touch panel accepts the input operation is displayed.

2. The information processing device as set forth in claim 1, wherein the region determining section determines, as the given region, a region in which a given image included in the element image is displayed.

3. The information processing device as set forth in claim 1, wherein the region determining section determines, as the given region, a region in which the element image that is associated with state specifying information is displayed, the state specifying information indicating that the external near field communication is performed via tire at least one of the plurality of antennas.

4. The information processing device as set forth in any one of claim 1, wherein the region determining section determines, as the given region, a region in which the element image that is selected by an input operation conducted by a user is displayed.

5. The information processing device as set forth in claim 1, wherein the region determining section determines, as the given region, a region which includes the element image and which is selected by an input operation conducted by a user.

6. The information processing device as set forth, in claim 1, further comprising:
a process performing section which performs, depending on a terminal device that is brought into proximity to one of the plurality of antennas which one is in the communication state, a process that is associated with the element image displayed in a region including the one of the plurality of antennas.

7. The information processing device as set forth in claim 6, wherein, as the process that is associated with the element image, the process performing section transmits information, associated with the element image, to the terminal device via the one of the plurality of antennas to which one the terminal device is brought into proximity.

8. The information processing device as set forth in claim 1, wherein the antenna control section controls the another one or more of the plurality of antennas to be in the non-communication state, by stopping supply of electric power to the another one or more of the plurality of antennas.

9. A display device comprising:
a display section; and
a near field communication section which is provided on the display section so as to be stacked on the display section and which includes a plurality of antennas via each of which external near field communication is performed,
the near field communication section controlling, in accordance with a region of an element image included in a screen displayed on the display section, each of the plurality of antennas to be in a communication state or in a non-communication state, the communication state being a state in which the each of the plurality of antennas allows the external near field communication to be performed via the each of the plurality of antennas, the non-communication state being a state in which the each, of the plurality of antennas allows the external near field communication not to be performed via the each of the plurality of antennas,
the display section being a touch panel which is capable of accepting an input operation conducted by a user, and
the near field communication section controlling at least one of the plurality of antennas, which at least one is included in the region, to be in the communication state and controlling the other of the plurality of antennas to be in the non-communication state, the region being a region in which the element image via which the touch panel accepts the input operation is displayed.

10. An information processing device which, controls each of a plurality of antennas of a display device to be in a communication state or in a non-communication state, the communication state being a state in which the each of the plurality of antennas allows external near field communication to be performed via the each of the plurality of antennas, the non-communication state being a state in which the each of the plurality of antennas allows the external near field communication not to be performed via the each of the plurality of antennas, the display device including a display section and a near field communication section which is provided on the display section so as to be stacked on the display section and which includes the plurality of antennas via each of which the external near field communication is performed, the information processing device comprising:
a region determining section which determines a given region of a display region of the display section in accordance with a region of an element image included in a screen displayed on the display section; and
an antenna control section which (i) controls, to be in the communication state, at least, one of the plurality of antennas which at least one is included in the given region and (ii) controls another one or more of the plurality of antennas to be in the non-communication state; and
a process performing section which performs, depending on a terminal device that is brought into proximity to one of the plurality of antennas which one is in the communication state, a process that is associated with the element image displayed in a region including the one of the plurality of antennas, wherein;
as the process that is associated with the element image, the process performing section transmits information, associated with the element image, to the terminal device via the one of the plurality of antennas to which one the terminal device is brought into proximity.

11. The information processing device as set forth in claim 10, wherein the region determining section determines, as the given region, a region in which a given image included in the element image is displayed.

12. The information processing device as set forth in claim 10, wherein the region determining section determines, as the given region, a region in which the element image that is associated with state specifying information is displayed, the state specifying information indicating that the external near field communication is performed via tire at least one of the plurality of antennas.

13. The information processing device as set forth in claim 10, wherein the region determining section determines, as the given region, a region in which the element image that is selected by an input operation conducted by a user is displayed.

14. The information processing device as set forth in claim 10, wherein the region determining section determines, as the given region, a region which includes the element image and which is selected by an input operation conducted by a user.

15. The information processing device as set forth in claim 10, wherein:
the display section is a touch panel which is capable of accepting an input operation conducted by a user; and
the region determining section determines, as the given region, a region in which the element image via which the touch panel accepts the input operation is displayed.

16. The information processing device as set forth in claim 10, wherein the antenna control section controls the another one or more of the plurality of antennas to be in the non-communication state, by stopping supply of electric power to the another one or more of the plurality of antennas.

17. A display device comprising:
a display section; and
a near field communication section which is provided on the display section so as to be stacked on the display section and which includes a plurality of antennas via each of which external near field communication is performed,
the near field communication section
controlling, in accordance with a region of an element image included in a screen displayed on the display section, each of the plurality of antennas to be in a communication state or in a non-communication state, the communication state being a state in which the each of the plurality of antennas allows the external near field communication to be performed via the each of the plurality of antennas, the non-communication state being a state in which the each of the plurality of antennas allows the external near field communication not to be performed via the each of the plurality of antennas, and
transmitting, depending on a terminal device that is brought into proximity to one of the plurality of antennas which one is in the communication state, information to the terminal device via the one of the plurality of antennas, the information being associated with the element image displayed in the region including the one of the plurality of antennas.

* * * * *